(12) United States Patent
Hoeper et al.

(10) Patent No.: US 12,503,030 B2
(45) Date of Patent: Dec. 23, 2025

(54) HIGH CAPACITY CARGO AND CONTAINER DOLLY

(71) Applicant: FAST Global Solutions, Inc., Glenwood, MN (US)

(72) Inventors: John Hoeper, Alexandria, MN (US); Jacob Baer, Alexandria, MN (US)

(*) Notice: Subject to any disclaimer, the term of this patent is extended or adjusted under 35 U.S.C. 154(b) by 280 days.

(21) Appl. No.: 18/138,833

(22) Filed: Apr. 25, 2023

(65) Prior Publication Data

US 2023/0373373 A1 Nov. 23, 2023

Related U.S. Application Data

(63) Continuation of application No. 16/751,595, filed on Jan. 24, 2020, now Pat. No. 11,667,228, which is a continuation-in-part of application No. PCT/US2018/063277, filed on Nov. 30, 2018.

(60) Provisional application No. 62/797,728, filed on Jan. 28, 2019, provisional application No. 62/754,196, filed on Nov. 1, 2018, provisional application No.
(Continued)

(51) Int. Cl.
| | |
|---|---|
| *B60P 7/08* | (2006.01) |
| *B60P 1/52* | (2006.01) |
| *B62B 5/00* | (2006.01) |
| *B62B 3/04* | (2006.01) |
| *B62B 3/10* | (2006.01) |

(52) U.S. Cl.
CPC ............... *B60P 1/52* (2013.01); *B60P 7/0892* (2013.01); *B62B 5/0093* (2013.01); *B62B 3/04* (2013.01); *B62B 3/10* (2013.01); *B62B 2202/12* (2013.01); *B62B 2203/44* (2013.01); *B62B 2203/74* (2013.01)

(58) Field of Classification Search
CPC ....... B60P 7/0892; B62B 3/04; B62B 3/0625; B62B 2203/44
See application file for complete search history.

(56) References Cited

U.S. PATENT DOCUMENTS 1,434,016 A * 10/1922 Lovejoy ................ B62B 3/0631
254/10 C
2,439,423 A * 4/1948 Fowler ..................... B64D 9/00
269/254 R
(Continued)

*Primary Examiner* — Hilary L Gutman
(74) *Attorney, Agent, or Firm* — Christensen, Fonder, Dardi & Busse PLLC; Timothy J. Busse; Douglas J. Christensen

(57) ABSTRACT

A high capacity cargo/container dolly. The cargo/container dolly includes retractable side stops that actively retract a roller linkage assembly upon retraction of the retractable side stops rather than relying on passive gravitational forces for the retraction. In some embodiments, the retractable side stops are configured to avoid hold up on the cargo during retraction. The retractable side stops may be coupled to a retraction mechanism that may be actuated from either side of the cargo/container dolly, as well as from one or both ends of the cargo/container dolly. The dolly may include aspects that accommodates dynamic loads that occur during transport to mitigate inadvertent retraction of the retractable side stops or spurious release of catch assemblies that retains cargo on the dolly. The dolly may also include self-locking roller assemblies that release only in the presence of cargo, and deck modules that protect the deck roller from road spray contamination.

18 Claims, 32 Drawing Sheets

Related U.S. Application Data

62/746,304, filed on Oct. 16, 2018, provisional application No. 62/732,266, filed on Sep. 17, 2018, provisional application No. 62/593,797, filed on Dec. 1, 2017.

(56) References Cited

U.S. PATENT DOCUMENTS

| | | | | |
|---|---|---|---|---|
| 3,679,075 | A * | 7/1972 | Guyaux | B60P 1/52 |
| | | | | 414/536 |
| 3,698,679 | A * | 10/1972 | Lang | B64D 9/003 |
| | | | | 410/69 |
| 4,134,345 | A * | 1/1979 | Baldwin | B60P 7/132 |
| | | | | 410/70 |
| 4,375,932 | A * | 3/1983 | Alberti | B64D 9/003 |
| | | | | 410/94 |
| 4,541,768 | A * | 9/1985 | Walker | B64F 1/322 |
| | | | | 414/535 |
| 4,784,547 | A * | 11/1988 | Prinz | B60P 7/0892 |
| | | | | 410/156 |
| 4,787,808 | A * | 11/1988 | Shimoji | B62B 3/04 |
| | | | | 414/536 |
| 5,575,599 | A * | 11/1996 | Conlee | B60P 7/13 |
| | | | | 410/70 |
| 2009/0252568 | A1* | 10/2009 | Morin | B61D 45/007 |
| | | | | 410/69 |

* cited by examiner

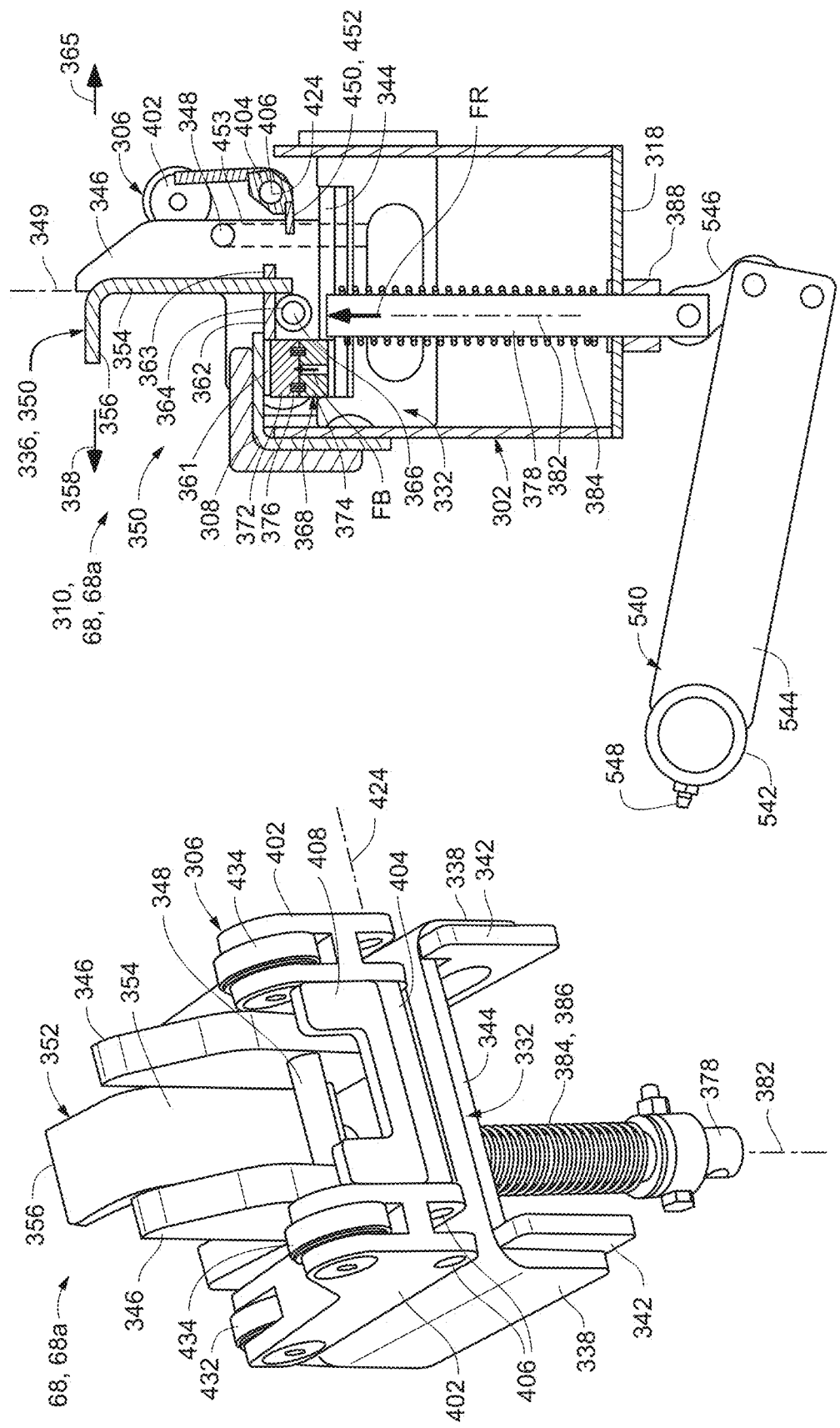

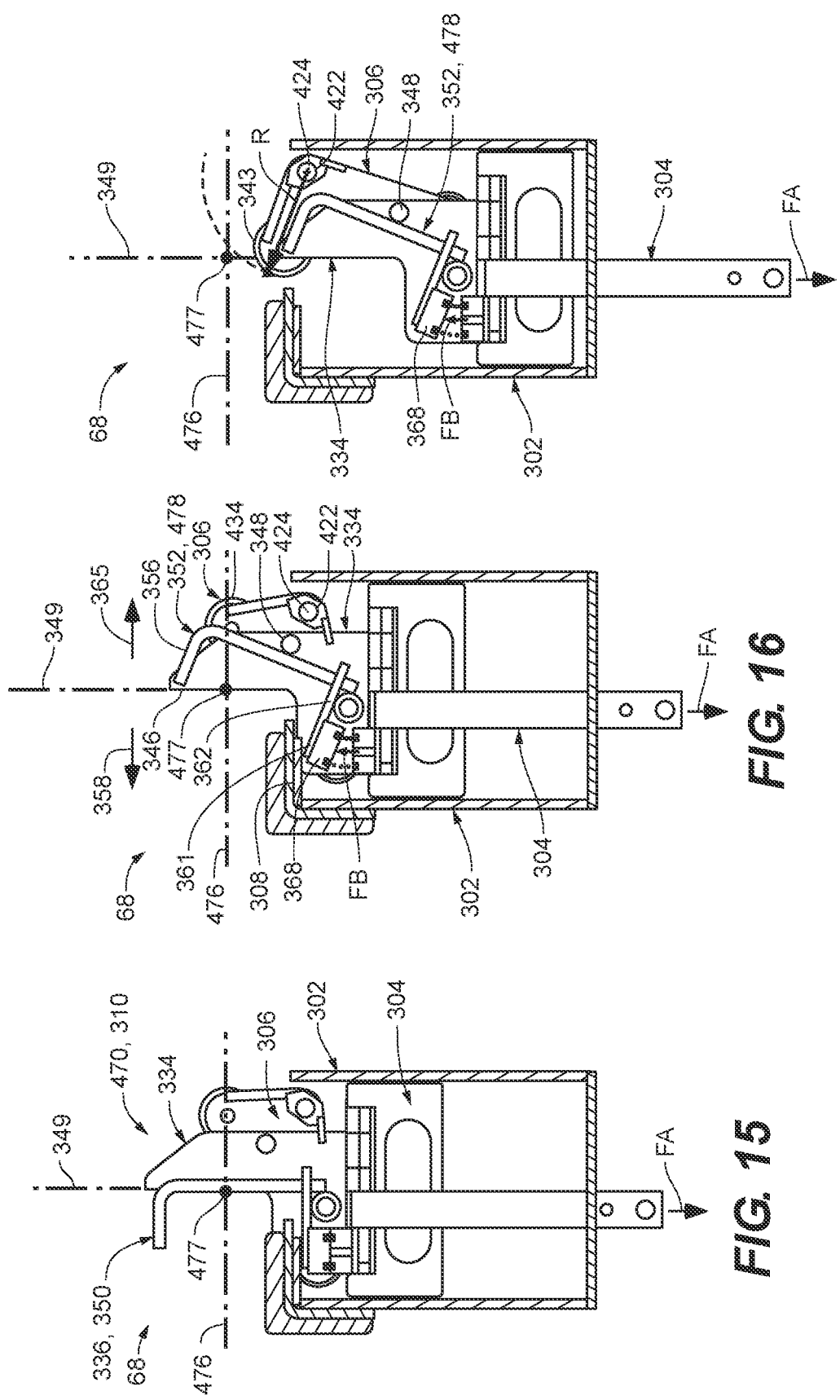

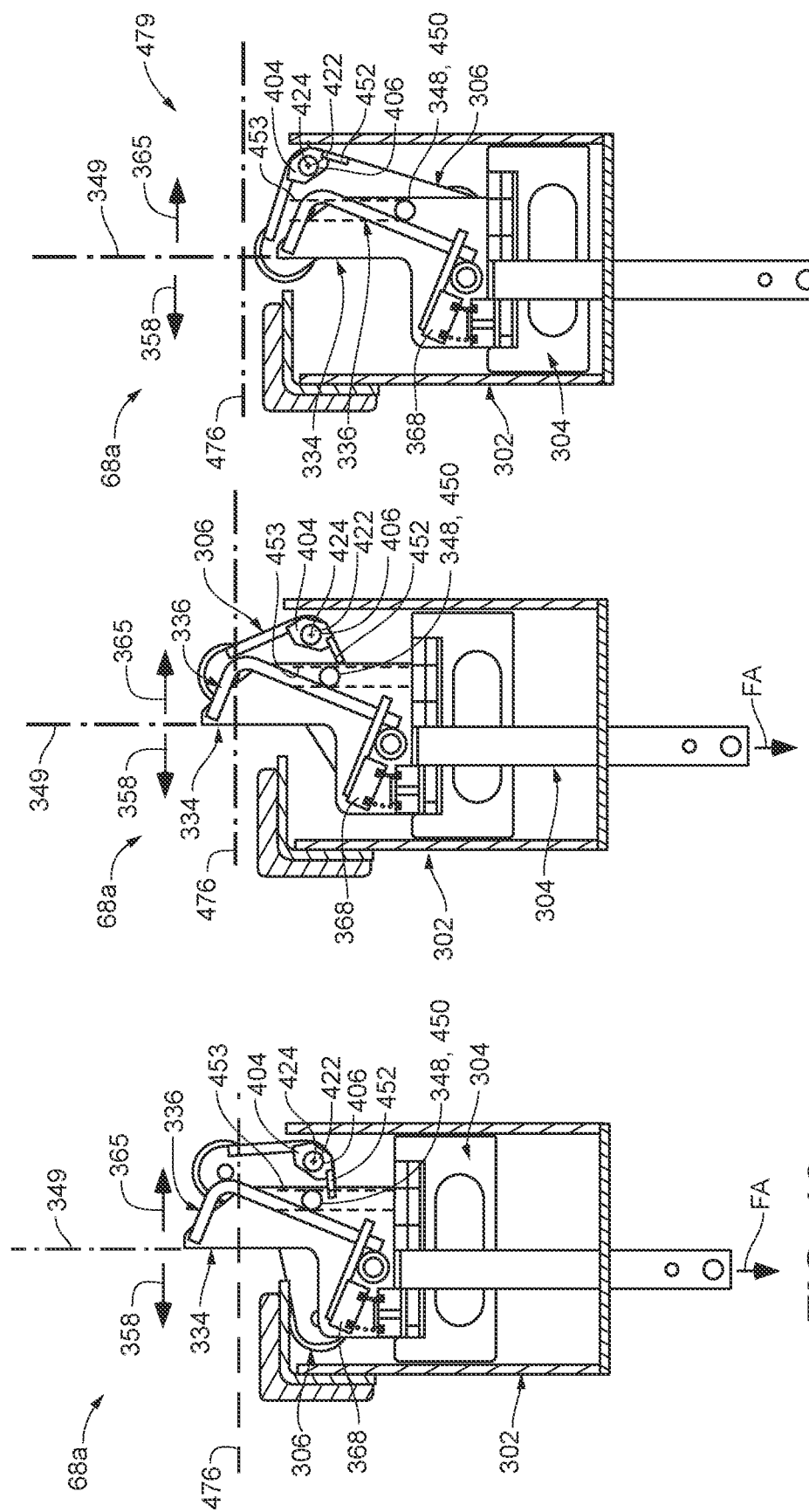

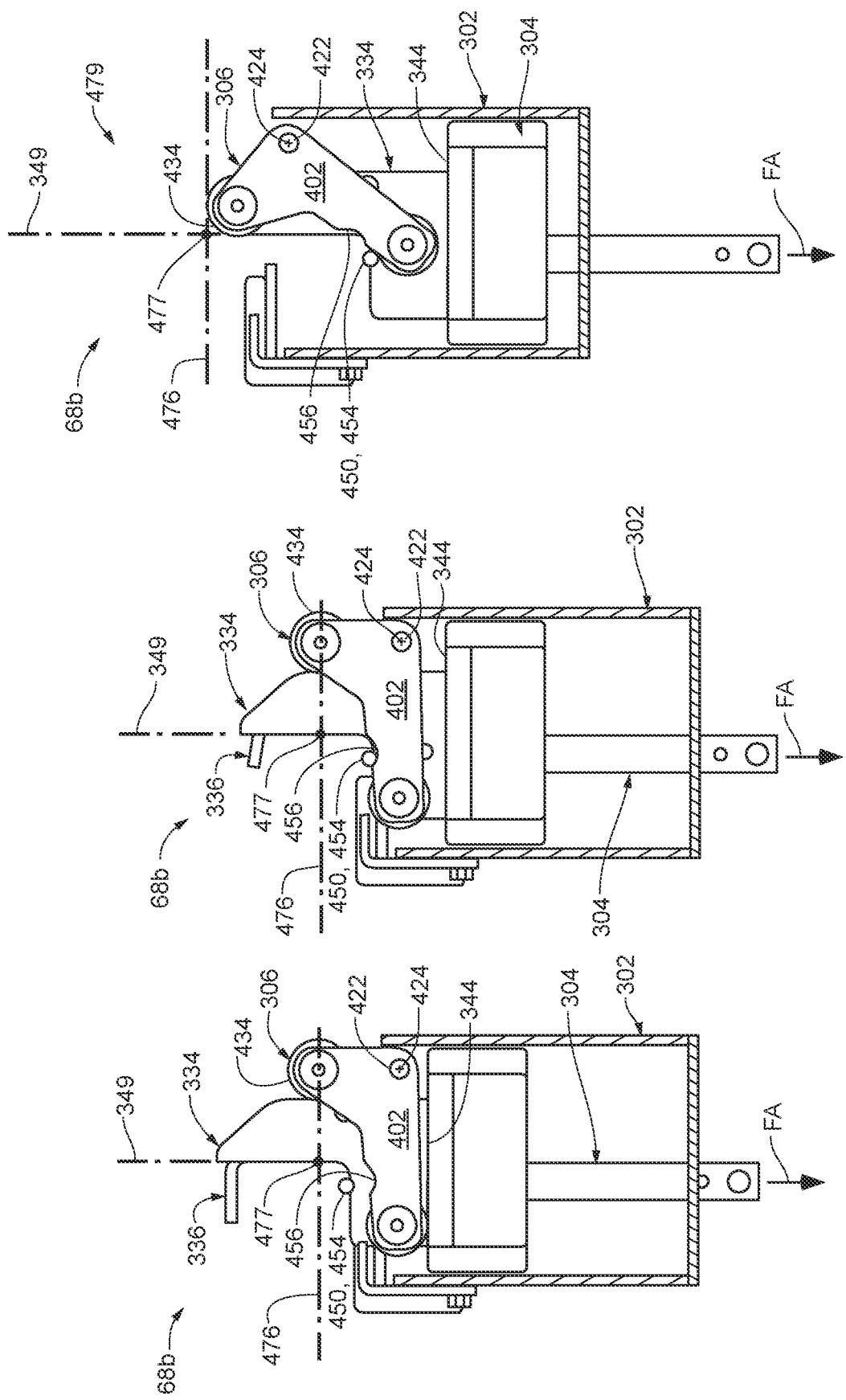

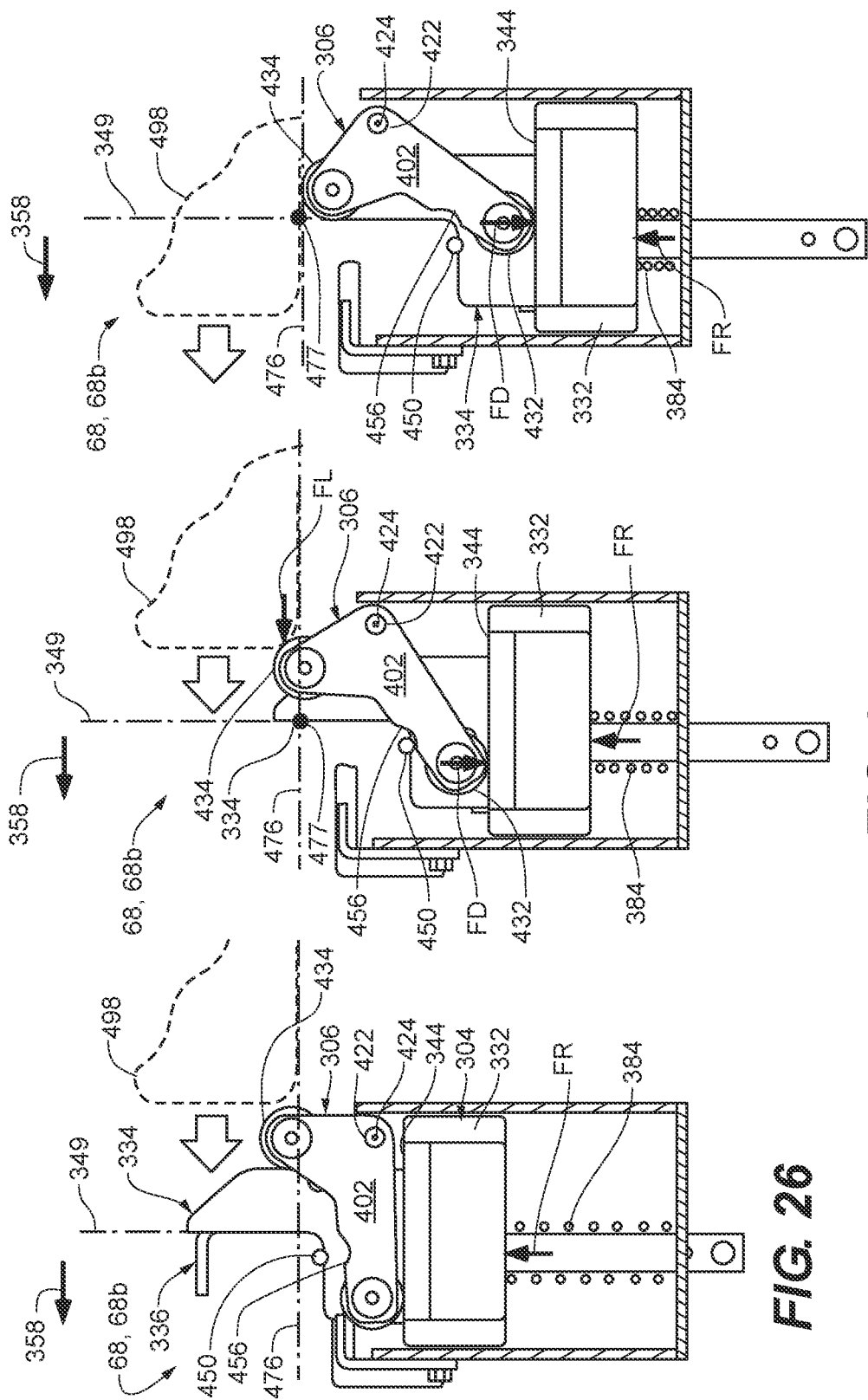

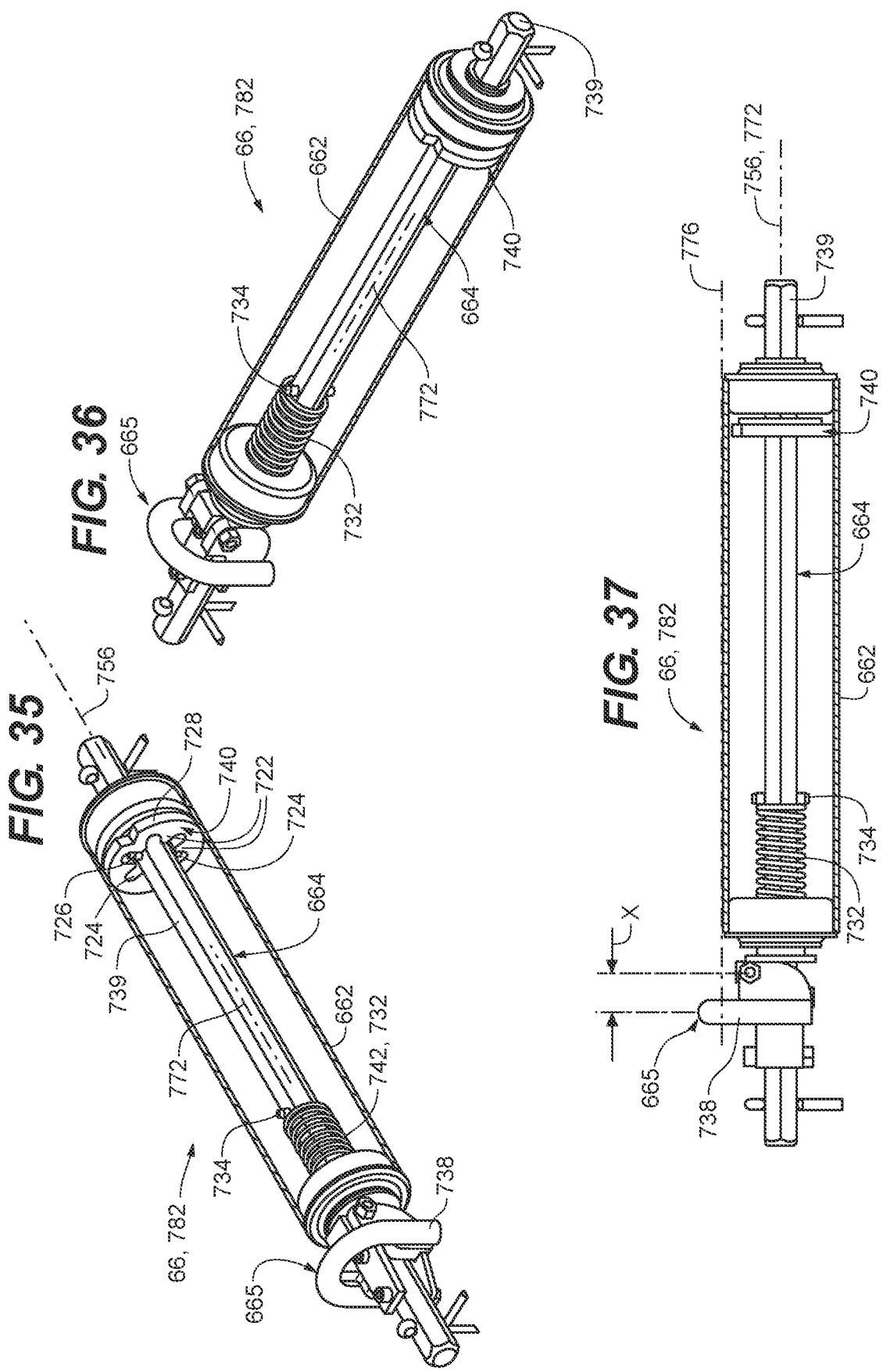

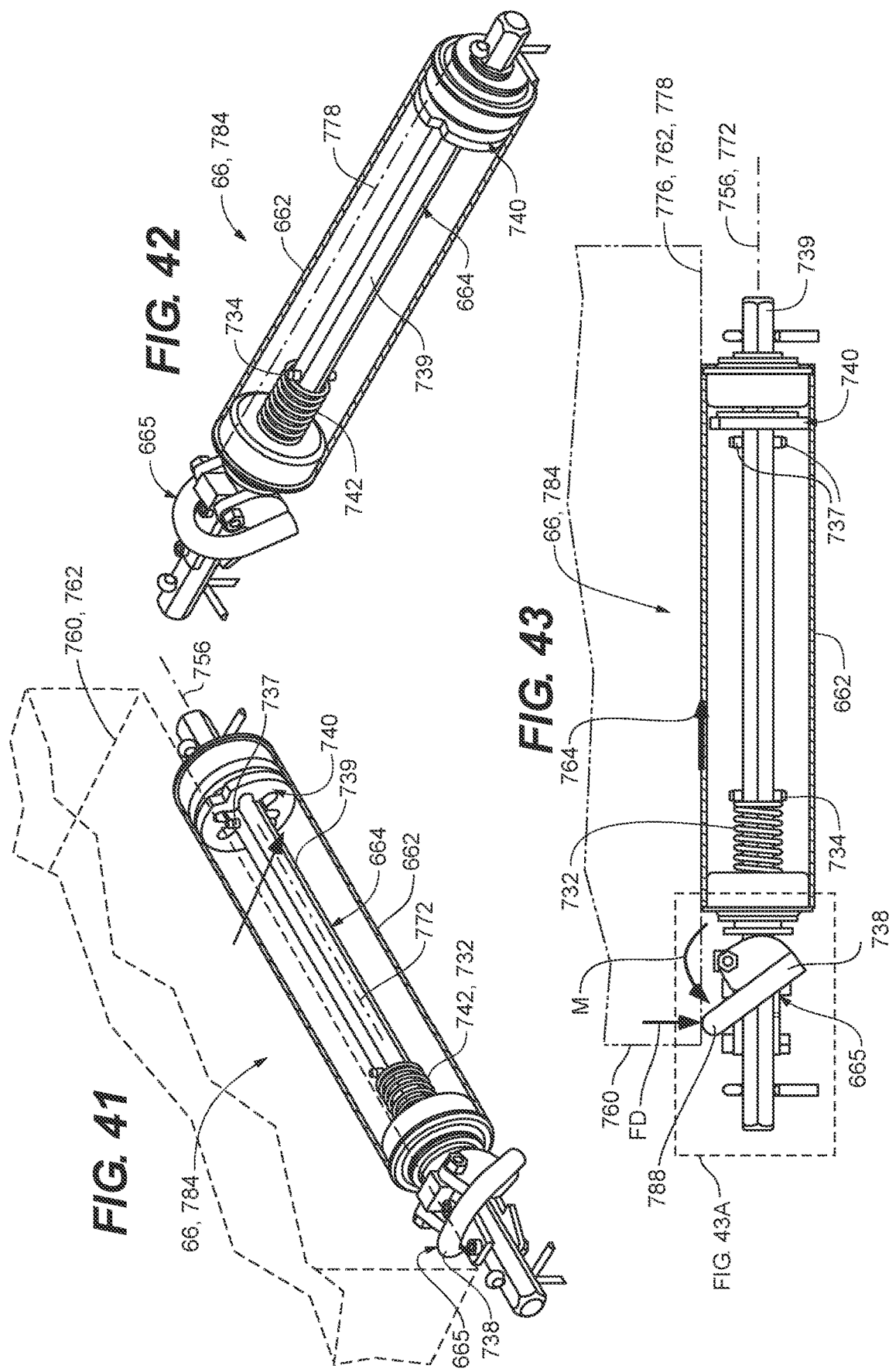

HIGH CAPACITY CARGO AND CONTAINER DOLLY

RELATED APPLICATIONS

This patent application is a continuation of U.S. patent application Ser. No. 16/751,959, filed Jan. 24, 2020, which claims the benefit of U.S. Provisional Application No. 62/797,739, filed Jan. 28, 2019 and is a continuation-in-part of International Application No. PCT/US2018/063277, filed Nov. 30, 2018, which claims the benefit of U.S. Provisional Application No. 62/593,797, filed Dec. 1, 2017, U.S. Provisional Application No. 62/732,266, filed Sep. 17, 2018, U.S. Provisional Application No. 62/746,304, filed Oct. 16, 2018, and U.S. Provisional Application No. 62/754,196, filed Nov. 1, 2018. The disclosures of the above-referenced patent applications are hereby incorporated by reference herein in their entirety.

BACKGROUND

Freight aircraft are often loaded and unloaded using two different dollies: "cargo dollies" and "container dollies." Cargo dollies are designed for loading and unloading large, heavy cargo into the wide, main deck of the aircraft. Examples of the containers that are loaded with cargo dollies include 224- by 318-centimeter (88- by 125-inch) containers and 244-by 318-centimeter (96- by 125-inch) containers. For cargo dollies, weight capacity and volume are at a premium to handle such containers. Container dollies are designed for loading and unloading smaller containers into the lower deck or "belly" of the aircraft. Examples of the containers that are loaded with container dollies include the LD2, LD3, and LD8. For container dollies, maneuverability and low clearance profile are at a premium to accommodate loading and unloading of cargo into the belly of aircraft.

Maintaining two fleets of dollies is duplicative and expensive. A dolly that can accommodate the capacity of cargo dollies while having the maneuverability and low clearance profile to perform as container dollies would be welcome.

SUMMARY

Various embodiments of the disclosure present a high capacity cargo/container dolly that performs the functions of both a cargo dolly and a container dolly. The disclosed cargo/container dolly is suited for the high capacity of cargo dollies (up to 15,000 pounds of weight) while having the maneuverability and low clearance profile of container dollies.

In addition, some embodiments include improvements to the functionality of certain components. Cargo dollies feature retractable side stops that contain cargo on the roller deck during transport and prevent cargo from being inadvertently rolled off the side of the dolly. The retractable side stops are retracted by operating personnel to offload the container. A restriction placed on cargo dollies is a maximum width of 102 inches, while the containers may be up to 96 inches in width. Accordingly, only a three inch operating envelope for the retractable side stops is provided on either side of the cargo dolly when handling containers of 96 inches width. Specifications require at least one inch margin on either side of a container to accommodate misalignment of the containers after loading, providing only a two inch width within which the retractable side stops must operate when handling containers of 96 inches width. Conventional retractable side stops can encroach on the one inch margin during retraction, such that when misalignment requires the full one inch margin, conventional retractable side stops can collide with and be "held up" by the container, preventing full retraction. When such hold up occurs, conventional retractable side stops can interfere with the offloading of the cargo container. Various embodiments of the disclosure include retractable side stops that have been modified to assure that the one inch margin available for 96 inch containers is not encroached, thereby eliminating the possibility of hold up on the container.

Conventional retractable side stops also rely in part on gravity to provide a full retraction. Over time, the mechanisms that relies on passive gravitational forces for proper operation can foul, causing certain components of the conventional retractable side stops to "hang up" and fail to retract. When components fail to fully retract, the conventional retractable side stops can interfere with the offloading of the cargo container. Various embodiments of the disclosed high capacity cargo/container dolly include retractable side stops that actively retract all components, and provides this feature within the two inch operating envelope available for retractable side stops, thereby mitigating the problems associated with the hang up of conventional retractable side stops that rely on passive gravitational forces for proper operation.

Various embodiments of the disclosure include an auxiliary or bypass retraction mechanism that selectively retracts the retractable side stops on only one side of the high capacity cargo/container dolly. The auxiliary retraction mechanism may be accessible from a front end of the high capacity cargo/container dolly, a back end of the high capacity cargo/container dolly, or both the front and the back end. The auxiliary retraction mechanism provides an alternative way to retract the retractable side stops when a given retraction mechanism provided on a side of the high capacity cargo/container dolly is inaccessible.

Various embodiments of the disclosure counter dynamic loads (e.g., jostling or jolting while being transported over uneven terrain or obstacles) that may otherwise cause the retractable side stops to spuriously retract during transport. We have found that, under such dynamic loading, the inertia of the retraction mechanisms and moving components of the retractable side stops can actually cause the retractable side stops to retract and release. Unchecked, such spurious retraction could cause containers to become unmoored and roll off the roller deck, for example when pulling the dolly through a turn. Various embodiments of the disclosure include ways to counter inadvertent release of cargo during the rigors of transport. Some embodiments counterbalance the weight of the retraction mechanisms and moving components of the retractable side stops, the counterbalance then countering the inertia of these components during an impact load. Some embodiments of the disclosure include biasing that counters the inertia generated by dynamic loads. Alternatively or in addition, some embodiments of the disclosure are designed to undergo vertical deflections that are greater relative to conventional retractable side stops before release of the cargo, thereby providing a greater tolerance to dynamic loading.

In various embodiments of the disclosure, the high capacity cargo/container dolly includes a plurality of deck modules that together make up a roller deck. In some embodiments, the deck modules include self-locking roller assemblies. The self-locking roller assemblies may be disposed proximate the edges of the high capacity cargo/container dolly, and are able to roll only when actuated by a sliding planar object, such as a container or pallet. As such, if operating personnel inadvertently step on a self-locking roller assembly, the roller remains locked, so that the operating personnel will not lose their footing.

Structurally, various embodiments of a high capacity cargo/container dolly are disclosed including a framework with an outer frame having opposed side beam assemblies separated by a forward beam assembly and a rearward beam assembly, a roller deck including a plurality of swivel casters having upper extremities that define and are coplanar with a registration plane, the registration plane being generally horizontal, and a side stop disposed proximate one of the opposed side beam assemblies. In some embodiments, the side stop includes a housing, a plunger assembly translatable in a vertical direction within the housing, the plunger assembly including a platform portion, and a roller linkage assembly pivotally coupled to the housing about a pivot axis. The roller linkage assembly may include a pivot arm pivotal about the pivot axis and having a first end and a second end, a first roller disposed at the first end of the pivot arm that contacts the platform portion of the plunger assembly, and a second roller disposed at a second end of the pivot arm that extends above the registration plane. An actuation member may be operatively coupled to the plunger assembly and configured to contact the roller linkage assembly when the plunger assembly is translated downward into the housing and if the pivot arm does not rotate about the pivot axis due to gravity.

In various embodiments of the disclosure, a retractable side stop of the high capacity cargo/container dolly includes a stop bracket mounted to the housing that defines an uppermost position of the plunger assembly, a stop finger coupled to the plunger assembly and defining a vertical stop plane, and a catch assembly including a hook that extends upward from a lever, the lever being mounted to a pivot that is coupled to the plunger assembly, the lever including a laterally inward portion that defines a length having a lateral dimension that extends from the pivot toward the centerline of the framework, the laterally inward portion of the lever extending underneath the stop bracket. In a capture configuration, the laterally inward portion of the lever of the catch assembly is engaged in contact with the stop bracket and the hook of the catch assembly extends above the registration plane and a bend portion of the hook extends laterally inward relative to the vertical stop plane. In a release configuration, the bend portion of the hook is positioned entirely laterally outward relative to the vertical stop plane, the laterally inward portion of the lever being configured to disengage from contact with the stop bracket to attain the release configuration when the plunger assembly is translated axially downward relative to the uppermost position. In some embodiments, the laterally inward portion of the lever is configured to disengage from contact with the stop bracket when the plunger assembly is translated a minimum downward vertical displacement from the uppermost position, the minimum downward vertical displacement being in a range of ⅝ inch to 1½ inch inclusive. In some embodiments, the minimum downward vertical displacement being in a range of ¾ inch to 1 inch inclusive.

Various embodiments of a high capacity cargo/container dolly include a framework with an outer frame having opposed side beam assemblies separated by a forward beam assembly and a rearward beam assembly, the framework defining a centerline that extends from the forward beam assembly to the rearward beam assembly and is equidistant between the opposing side beam assemblies. A roller deck includes a plurality of swivel casters having upper extremities that define and are coplanar with a registration plane, the registration plane being generally horizontal. In some embodiments, a retractable side stop is disposed proximate one of the opposed side beam assemblies and is configurable in a deployed configuration and a retracted configuration. The retractable side stop may include a housing, a plunger assembly translatable in a vertical direction within the housing, the plunger assembly including a platform portion, a stop finger coupled to the plunger assembly and defining a vertical stop plane, the vertical stop plane intersecting the registration plane at an intersection line, the intersection line being substantially parallel to the centerline, and a roller linkage assembly pivotally coupled to the housing about a pivot axis. In the deployed configuration, the roller linkage assembly extends through the registration plane and is disposed laterally outward relative to the centerline from the intersection line. In the retracted configuration, the roller linkage assembly is rotated completely below the registration plane. In some embodiments, in transitioning the retractable side stop from the deployed configuration to the retracted configuration, the roller linkage assembly is rotated completely below the registration plane without crossing the intersection line.

Various embodiments of a high capacity cargo/container dolly include a framework including an outer frame having opposed side beam assemblies separated by a forward beam assembly and a rearward beam assembly, a roller deck including a plurality of swivel casters having upper extremities that define and are coplanar with a registration plane, the registration plane being generally horizontal, and a retractable side stop disposed proximate one of the opposed side beam assemblies. The retractable side stop includes a housing, a plunger assembly translatable in a vertical direction within the housing, the plunger assembly including a platform portion, a stop finger coupled to the plunger assembly, and a roller linkage assembly pivotally coupled to the housing about a pivot axis. The roller linkage assembly may include a pivot arm pivotal about the pivot axis and having a first end and a second end, a first roller disposed at the first end of the pivot arm that contacts the platform portion of the plunger assembly, and a second roller disposed at a second end of the pivot arm that extends above the registration plane. The retractable side stop may include means for rotating the roller linkage assembly about the pivot axis if the roller linkage assembly does not rotate about the pivot axis due to gravity. In some embodiments, the means for rotating the roller linkage assembly about the pivot axis includes an actuation member coupled to the stop finger, the actuation member configured to contact the roller linkage assembly if the roller linkage assembly does not rotate about the pivot axis due to gravity. In one embodiment, the actuation member contacts an extension tab that extends from the roller linkage assembly into a translation path of the actuation member if the roller linkage assembly does not rotate about the pivot axis due to gravity. In another embodiment, the actuation member contacts the pivot arm of the roller linkage assembly if the roller linkage assembly does not rotate about the pivot axis due to gravity. The pivot arm may include a cam surface for contact with the actuation member, the cam surface defining a recess. In some embodiments, the retractable side stops are mounted to the one of the opposed side beam assemblies.

Various embodiments of a high capacity cargo/container dolly include a framework including an outer frame having opposed side beam assemblies separated by a forward beam assembly and a rearward beam assembly, a first retractable side stop coupled to a first of the opposed side beam assemblies, a first foot actuated retraction mechanism operatively coupled to the first retractable side stop, a second retractable side stop coupled to the second of the opposed side beam assemblies, a second foot actuated retraction mechanism operatively coupled to the second retractable side stop, and an auxiliary retraction mechanism including a rotatable linkage that extends axially through the framework, and a distal end of the rotatable linkage being coupled to the first foot actuated retraction mechanism and to the second foot actuated retraction mechanism. In some embodiments, rotating the auxiliary retraction mechanism in a first rotational direction selectively actuates the first foot actuated retraction mechanism to retract the first retractable side stop without retracting the second retractable side stop, while rotating the auxiliary retraction mechanism in a second rotational direction selectively actuates the second foot actuated retraction mechanism to retract the second retractable side stop without retracting the first retractable side stop, the second rotational direction being opposite the first rotational direction.

In some embodiments, the first foot actuated retraction mechanism includes a first rotation linkage assembly coupled to the first retractable side stop for actuation of the first retractable side stop, a first lineal linkage assembly coupled to and configured to rotate the first rotation linkage assembly, the first lineal linkage extending laterally through the framework, and a first foot pad coupled to the first lineal linkage for translating the first lineal linkage to rotate the first rotation linkage assembly and actuate the first retractable side stop, the first foot pad being accessible from a second of the opposed side beam assemblies. In some embodiments, the second foot actuated retraction mechanism includes a second rotation linkage assembly coupled to the second retractable side stop for actuation of the second retractable side stop, a second lineal linkage assembly coupled to and configured to rotate the second rotation linkage assembly, the second lineal linkage extending laterally through the framework, and a second foot pad coupled to the second lineal linkage for translating the second lineal linkage to rotate the second rotation linkage assembly and actuate the second retractable side stop, the second foot pad being accessible from the first of the opposed side beam assemblies.

In some embodiments of the disclosure, a first torque return spring is directly attached to the first foot actuated retraction mechanism, and a second torque return spring directly attached to the second foot actuated retraction mechanism, the first torque return spring and the second torque return spring being configured to resist dynamic loads on the first foot actuated retraction mechanism and the second foot actuated retraction mechanism, respectively. In some embodiments, a first torque return spring directly attached to the first rotation linkage assembly, the first torque return spring being configured to resist dynamic loads on the first foot actuated retraction mechanism. The first torque return spring may be a linear spring having a first end attached to the first rotational linkage and a second end attached to the framework to apply a linear tangential torsion force to the first rotational linkage.

In some embodiments, the auxiliary retraction mechanism is hand actuated, a proximal end of the rotatable linkage being coupled to an actuation handle, and a distal end of the rotatable linkage is coupled to the first lineal linkage assembly and the second lineal linkage assembly. The auxiliary retraction mechanism may include an actuation plate that extends from the rotatable linkage, a first contact structure coupled to the first lineal linkage assembly and disposed adjacent a first side of the actuation plate, and a second contact structure coupled to the second lineal linkage assembly and disposed adjacent a second side of the actuation plate, the second side of the actuation plate being opposite the first side of the actuation plate. In some embodiments, rotation of the rotatable linkage in the first rotational direction causes the actuation plate to engage the first contact structure and actuate the first rotation linkage assembly for retraction of the first retractable stop, and rotation of the rotatable linkage in the second rotational direction causes the actuation plate to engage the second contact structure and actuate the second rotation linkage assembly for retraction of the second retractable stop.

Various embodiments of a high capacity cargo/container dolly include a framework including an outer frame and a plurality of stringers that extend parallel to each other and are supported by a forward beam assembly and a rearward beam assembly of the outer frame, the framework defining an upper registration surface, a plurality of tineways attached to the upper registration surface of the framework, each of the plurality of tineways extending parallel to each other and being supported by opposed side beam assemblies and the plurality of stringers of the framework, the tineways extending orthogonal to the opposed side beam assemblies, and a plurality of deck modules configured to mount to the upper registration surface of the framework. Each of the deck modules may include a lower base plate, an upper tread plate that extends over the lower base plate, and a plurality of swivel rollers mounted to the lower base plate, each of the plurality of swivel rollers including a roller that extends through the upper tread plate. The tineways and the framework may define a plurality of openings at the upper registration surface, the lower base plates of the plurality of deck modules being configured to cover the plurality of openings to shield the upper tread plates of the plurality of deck modules and the plurality of swivel rollers from road spray. In some embodiments, high capacity cargo/container dolly includes a plurality of self-locking roller assemblies, each being mounted proximate an edge portion of a respective one of the plurality of deck modules having the edge portion registered on the upper registration surface of one of the opposing side beam assemblies. The upper registration surface may be planar.

Various embodiments of a high capacity cargo/container dolly include an actuation linkage defining a rocker axis and having pivotal coupling to the high capacity cargo/container dolly about the rocker axis, the actuation linkage including: a first arm that extends in a first lateral direction from the rocker axis, the first arm being coupled to the plunger assembly of the retractable side stop; a second arm that extends in a second lateral direction from the rocker axis, the second lateral direction being generally opposite the first lateral direction; and a counterweight affixed to the second arm. The counterweight and the second arm may be unitary. The counterweight and the second arm may also be tailored to counter dynamic system inertial moments about the rocker axis. In some embodiments, a foot actuated retraction mechanism operatively coupled to the retractable side stop for reconfiguration of the retractable side stop from a deployed configuration to a retracted configuration, the foot actuated retraction mechanism including a rotatable shaft that is rotatable about a rotation axis, wherein the actuation linkage is pivotally mounted to the rotatable shaft for the pivotal coupling to the high capacity cargo/container dolly, the rocker axis of the actuation linkage being concentric with the rotation axis of the rotatable shaft. In some embodiments, the foot actuated retraction mechanism includes a cam arm mounted to and in fixed rotational relation with the rotatable shaft, the cam arm configured to exert a force on the actuation linkage when the foot actuated retraction mechanism is actuated.

BRIEF DESCRIPTION OF THE DRAWINGS

FIG. 10 is a rear perspective view of the internal components of the retractable side stop of FIG. 8 according to an embodiment of the disclosure;

FIG. 11 is a sectional view of the retractable side stop of FIG. 8 coupled to an actuation linkage according to an embodiment of the disclosure;

FIG. 15 is a sectional view of the retractable side stop of FIG. 8 in a deployed configuration according to an embodiment of the disclosure;

FIG. 16 is a sectional view of the retractable side stop in FIG. 15 in a partially retracted and released configuration according to an embodiment of the disclosure;

FIG. 17 is sectional view of the retractable side stop in FIG. 15 in a fully retracted configuration according to an embodiment of the disclosure;

FIGS. 18 through 20 are sectional views depicting the operation of an actuation member of the retractable side stop of FIG. 8 according to an embodiment of the disclosure;

FIGS. 21 through 23 are partial sectional views depicting the operation of an actuation member of the retractable side stop of FIG. 12 according to an embodiment of the disclosure;

FIGS. 26 through 28 are partial sectional views of the retractable side stop of FIG. 12 being actuated by a roller linkage assembly according to an embodiment of the disclosure;

FIGS. 35 and 36 are perspective, partial cutaway views of the locking roller assembly of FIG. 34 in a locked configuration according an embodiment of the disclosure;

FIG. 37 is a front elevational view of the locking roller of FIG. 35 according to an embodiment of the disclosure;

FIGS. 41 and 42 are perspective, partial cutaway views of the locking roller assembly of FIG. 34 in an unlocked configuration according an embodiment of the disclosure;

FIG. 43 is a front elevational view of the locking roller of FIG. 41 according to an embodiment of the disclosure;

DETAILED DESCRIPTION

Figure 1:
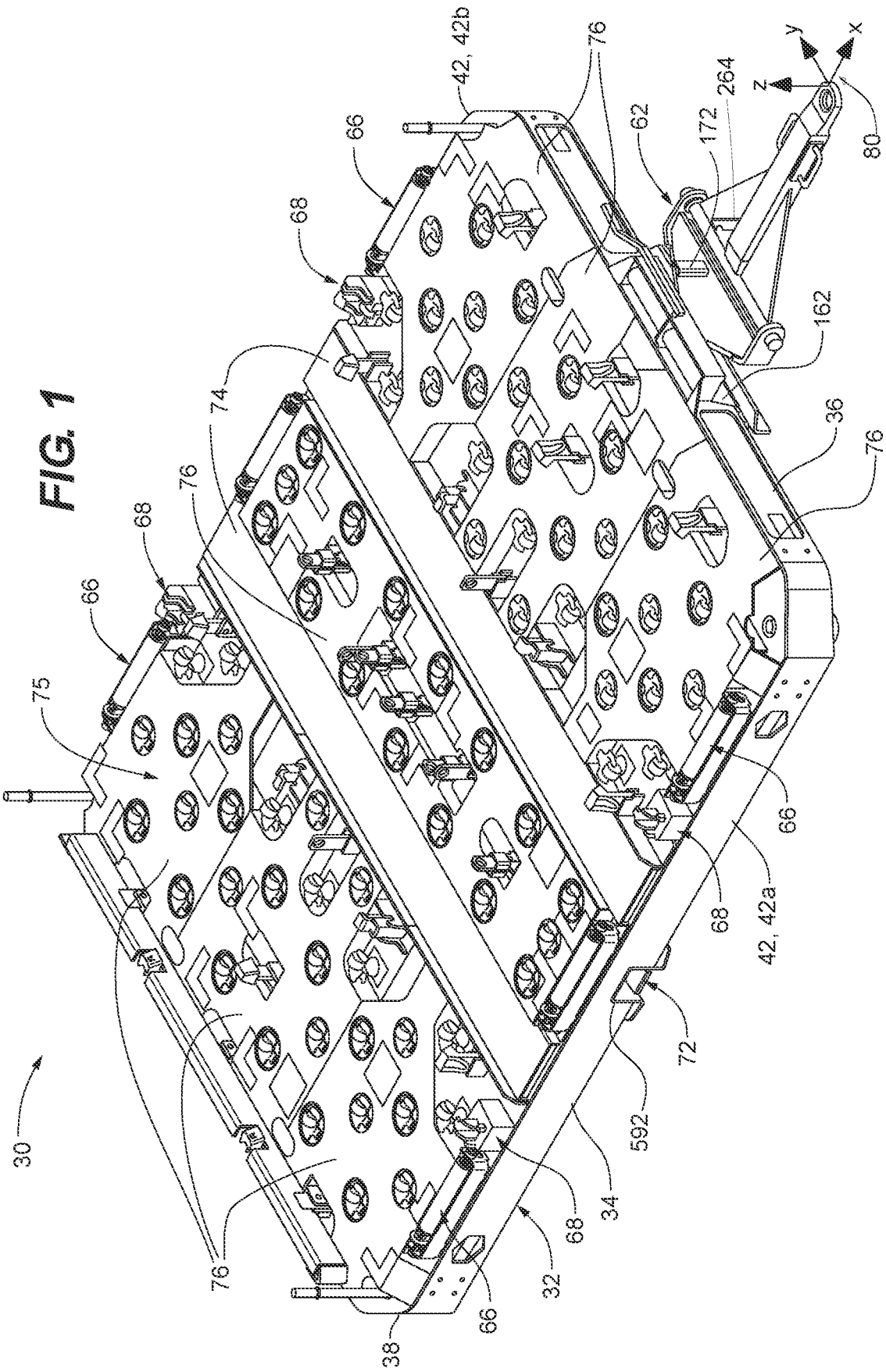
FIG. 1 is an upper perspective view of a high capacity cargo/container dolly according to an embodiment of the disclosure.
Figure 2:
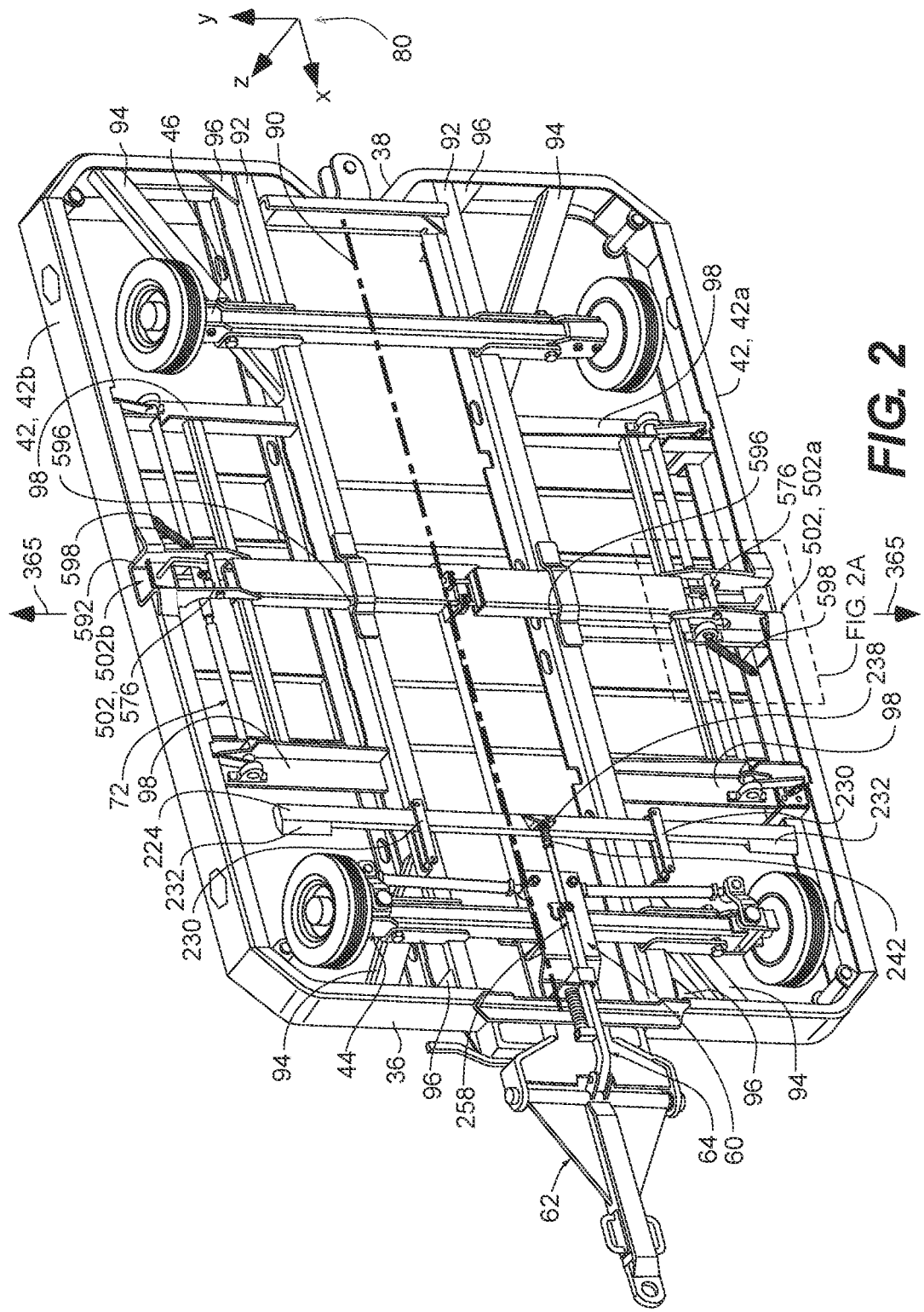
FIG. 2 is a lower perspective view of the high capacity cargo/container dolly of FIG. 1 according to an embodiment of the disclosure.

Referring to FIGS. 1 and 2, a high capacity cargo/container dolly 30 is depicted according to an embodiment of the disclosure. The high capacity cargo/container dolly 30 includes a framework 32 having an outer frame 34 with a forward beam assembly 36 and a rearward beam assembly 38 separated by side beam assemblies 42a and 42b. A directional Cartesian coordinate 80 of arbitrary origin is associated with the high capacity cargo/container dolly 30. The side beam assemblies 42a, 42b are referred to collectively and generically by reference character 42. The framework 32 is supported by forward and rearward wheel and axle assemblies 44, 46. In some embodiments, the forward wheel and axle assembly 44 includes an Ackerman steering mechanism 60 coupled to a tow bar 62 that extends forward of the forward beam assembly 36 and rotates upward (i.e., in the positive z-direction of the Cartesian coordinate 80 of FIG. 1) to actuate a brake assembly 64. In some embodiments, self-locking roller assemblies 66 are positioned over the side beam assemblies 42. Also, retractable side stops 68 may be positioned proximate the side beam assemblies 42, the retractable side stops 68 being actuated by a retraction mechanism assembly 72. A plurality of tineways 74 are supported by and extend laterally (i.e., parallel to the y-axis of the Cartesian coordinate 80 of FIG. 1) between the side beam assemblies 42. In some embodiments, the framework 32 also supports roller deck 75 comprising a plurality of deck modules 76, which may include the self-locking roller assemblies 66.

The framework 32 defines a centerline 90 that is parallel to the x-axis of the Cartesian coordinate 80, the centerline 90 extending from the forward beam assembly 36 to the rearward beam assembly 38, and being equidistant between the side beam assemblies 42. The framework 32 may include stringers 92 that extend between and are supported by the forward and rearward beam assemblies 36, 38, and may be buttressed by gusset beams 94 and gusset plates 96. In some embodiments, the tineways 74 extend parallel to each other and are supported by the opposed side beam assemblies 42 and the stringers 92 of the framework 32, with the tineways 74 extending orthogonal to the opposed side beam assemblies 42. The framework 32 may include cross members 98 that extend between and are supported by the side beam assemblies 42 and the stringers 92.

Figure 5:
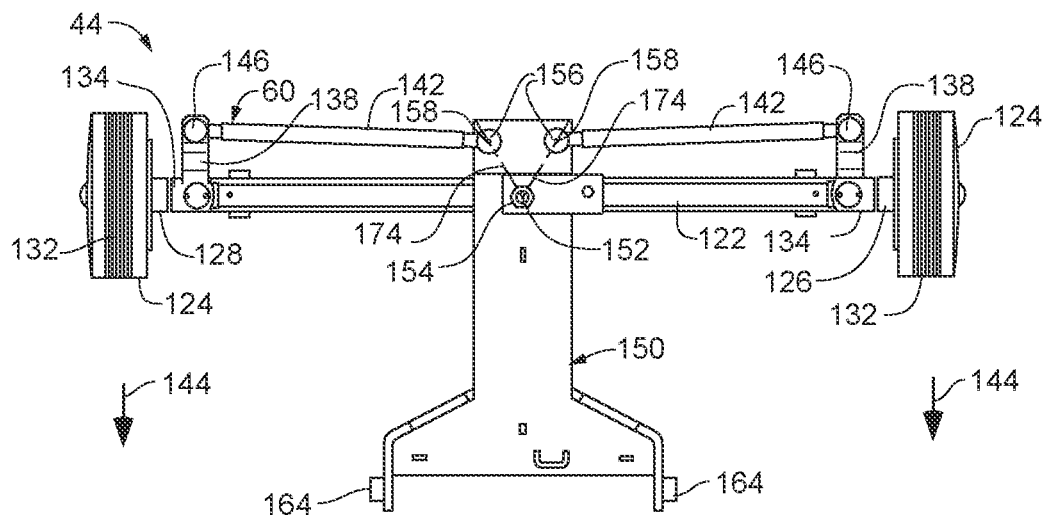
FIG. 5 is a plan view of the forward axle assembly of FIG. 3 according to an embodiment of the disclosure.
Figure 3:
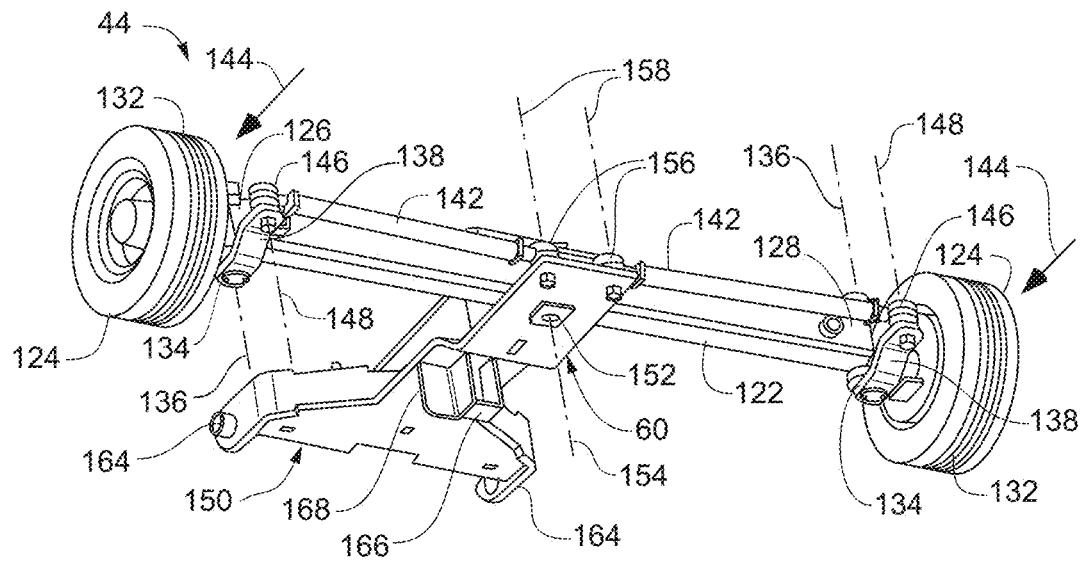
FIG. 3 is a lower perspective view of a forward axle assembly with an Ackerman steering mechanism according to embodiments of the disclosure.
Figure 4:
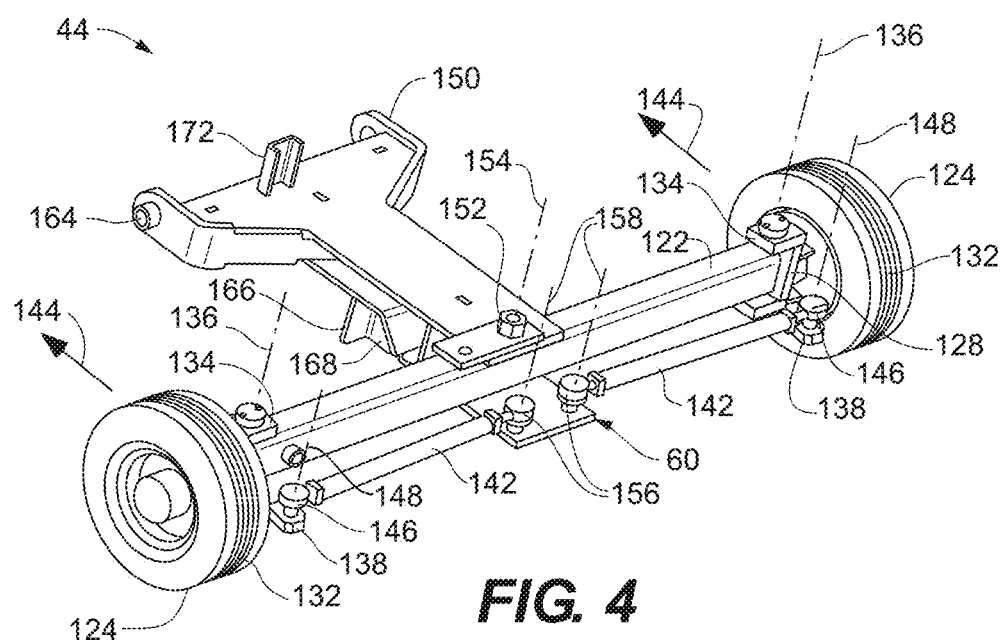
FIG. 4 is an upper perspective view of the forward axle assembly of FIG. 3 according to an embodiment of the disclosure.

Referring to FIGS. 3 through 5, the forward wheel and axle assembly 44 with Ackerman steering mechanism 60 is depicted in isolation according to an embodiment of the disclosure. The forward wheel and axle assembly 44 includes an axle tube 122 with wheel assemblies 124 coupled to opposed ends 126, 128 of the axle tube 122, with treaded tires 132 mounted to the wheel assemblies. The Ackerman steering mechanism 60 includes pivoting wheel mounts 134 mounted to the opposed ends 126, 128, by which the wheel assemblies 124 are coupled to the opposed ends 126, 128. Each of the pivoting wheel mounts 134 define a wheel assembly pivot axis 136 about which the respective wheel assembly 124 pivots. The Ackerman steering mechanism 60 further includes steering arms 138, a pair of tie rods 142, and a yoke assembly 150. Each of the steering arms 138 extend in a direction that is substantially parallel to a direction of travel 144 of the respective wheel assembly 124 and includes a steering arm pivot 146 to which the tie rods 142 are mounted. Each steering arm pivot 146 defines a steering arm pivot axis 148 that extends vertically (i.e., parallel to the z-axis of the Cartesian coordinate 80 of FIG. 1). The yoke assembly 150 is mounted to the axle tube 122 about a pivot 152, the pivot 152 defining a yoke pivot axis 154 that extends vertically. The tie rods 142 are mounted to the yoke assembly 150 via a pair of tie rod pivots 156, each defining a linkage pivot axis 158 that extends vertically. The linkage pivot axes 158 are axially and laterally spaced relative to the yoke pivot axis 154. In some embodiments, the yoke assembly 150 extends through a slot 162 defined in the forward beam assembly 36 (FIG. 1) and may include laterally extending bosses 164 for pivotal mounting of the tow bar 62. The yoke assembly 150 may include a hanger 166 and a spring plate 168 that extend downward (i.e., in the negative z-direction of the Cartesian coordinate 80 of FIG. 1) for facilitating the brake assembly 64. The yoke assembly 150 may include a brake latch plate 172 to facilitate latching of the tow bar 62.

The linkage pivot axes 158 and the steering arm pivot axes 148 are located on the same side of the yoke pivot axis 154 and the wheel assembly pivot axes 136 in the axial direction, the axial direction being parallel to the z-axis of the Cartesian coordinate 80 (FIG. 1) of the high capacity cargo/container dolly 30. For example, FIGS. 3 through 5 depict the linkage pivot axes 158 as being rearward (i.e., in the negative x-direction of the Cartesian coordinate 80 of FIG. 1) of the yoke pivot axis 154 and the steering arm pivot axes 148 as being rearward of the wheel assembly pivot axes 136. Alternatively, this arrangement may be reversed. That is, the linkage pivot axes 158 may be defined forward (i.e., in the positive x-direction of the Cartesian coordinate 80 of FIG. 1) of the yoke pivot axis 154 and the steering arm pivot axes 148 forward of the wheel assembly pivot axes 136.

The lateral displacements of the linkage pivot axes 158 relative to the yoke pivot axis 154 provide the angled steering arm characteristic of the Ackerman steering geometry, thereby providing the effect of the inside wheel defining a smaller turn radius that the outside wheel when the cargo/container dolly 30 turns. Connecting lines 174 between the yoke pivot axis 154 and the linkage pivot axes 158, depicted in phantom in FIG. 5, effectively define the canted linkages characteristic of Ackerman steering systems.

Figure 7:
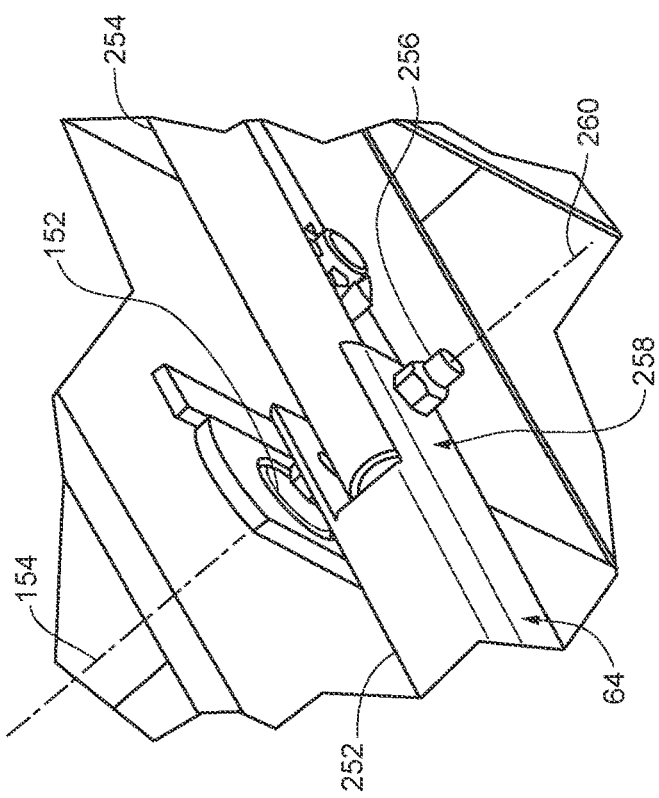
FIG. 7 is an enlarged, inset view of an articulating joint of FIG. 6 according to an embodiment of the disclosure.
Figure 6:
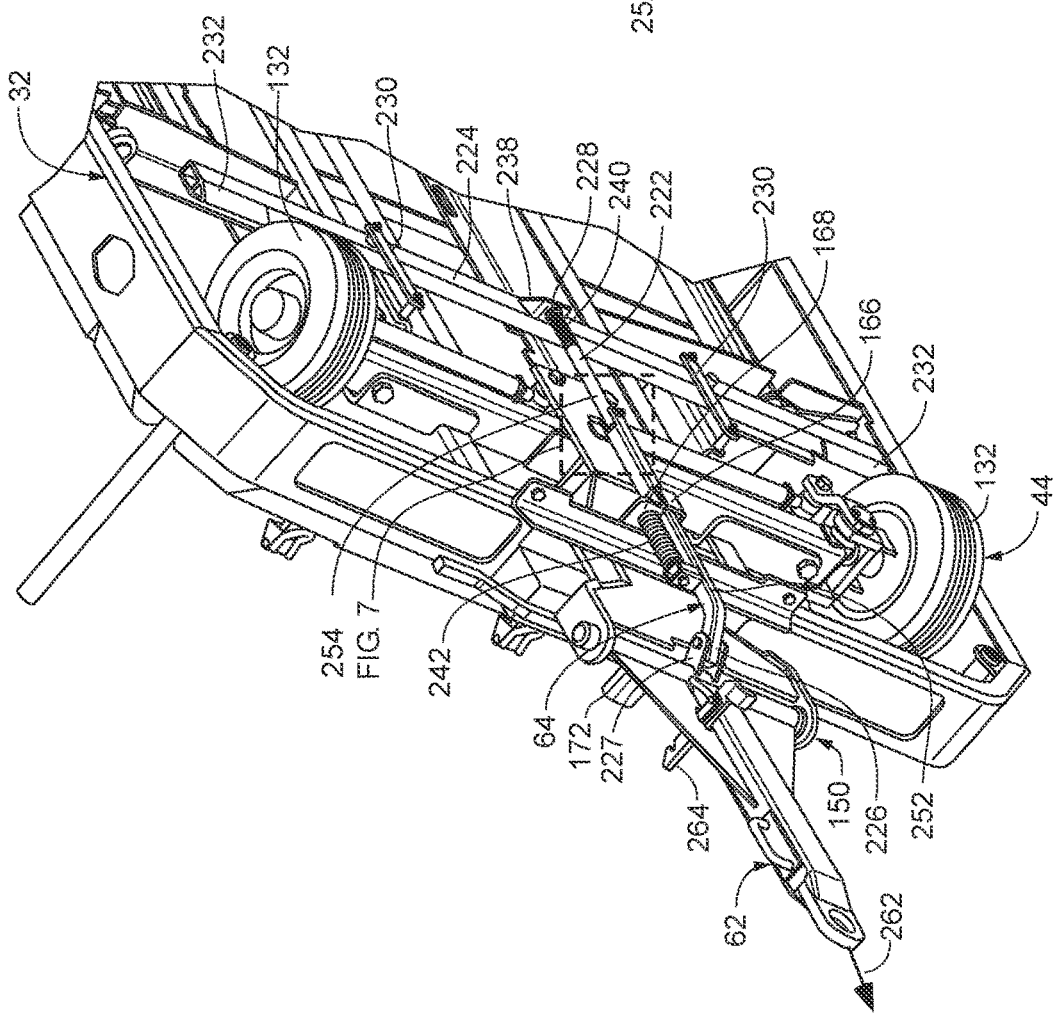
FIG. 6 is a lower perspective view of a brake assembly as installed on the high capacity cargo/container dolly of FIG. 1 according to an embodiment of the disclosure.
Figure 9:
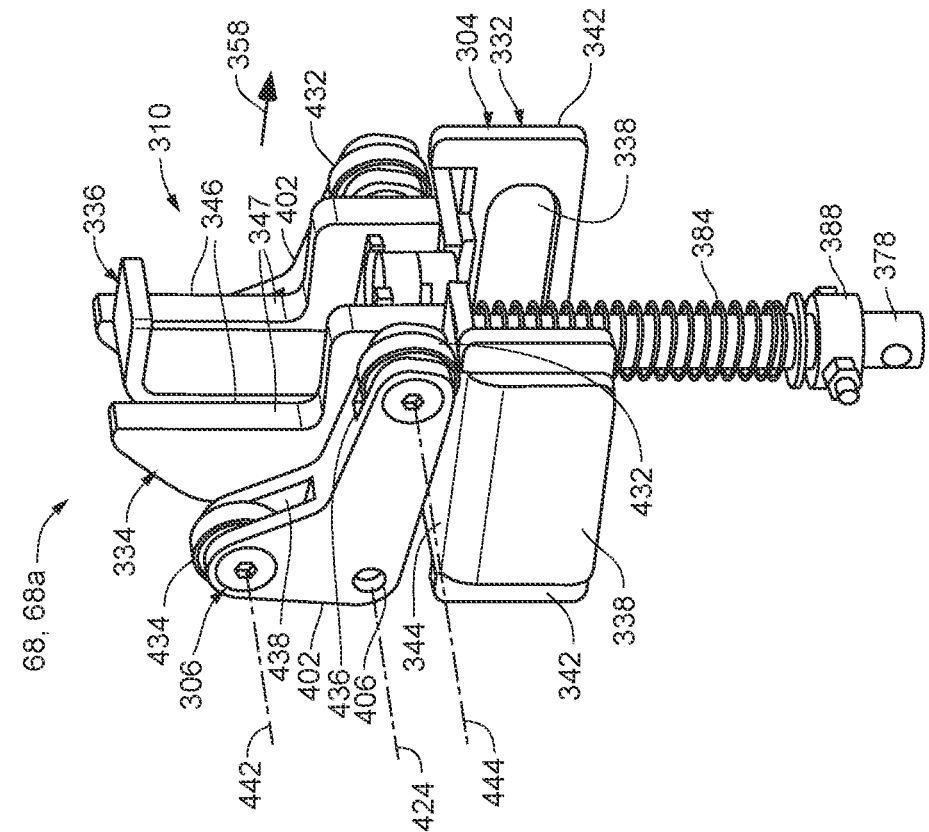
FIG. 9 is a front perspective view of the internal components of the retractable side stop of FIG. 8 according to an embodiment of the disclosure.
Figure 8:
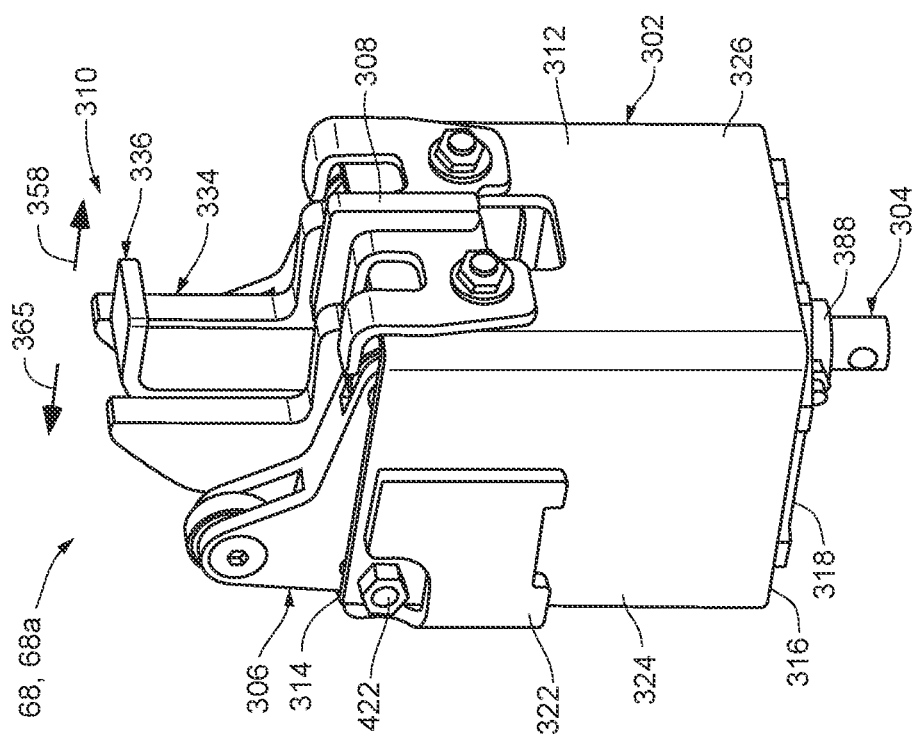
FIG. 8 is a front perspective view of a retractable side stop according to an embodiment of the disclosure.

Referring to FIGS. 6 and 7, the brake assembly 64 is depicted in greater detail according to an embodiment of the disclosure. The brake assembly 64 includes an actuation train 222 coupled to a brake bar 224. The actuation train 222 passes through the hanger 166 of the yoke assembly 150 and is suspended on a proximate end 226 by an offset pivot 227 that depends from the tow bar 62 and on a distal end 228 by the brake bar 224. The brake bar 224 is suspended by a pair of hangers 230 that depend from the framework 32, the hangers 230 being dimensioned to allow the brake bar 224 to slide fore and aft during operation. The brake bar 224 may include a pair of brake shoes 232 disposed proximate opposed ends of the brake bar 224, the brake shoes 232 being in axial alignment with the treaded tires 132. In the depicted embodiment, the actuation train 222 is coupled to a bracket 238 that depends from the brake bar 224, with a release spring 240 operatively coupled between the actuation train 222 and the bracket 238. A compression spring 242 is coupled on a first end to the actuation train 222 and on a second end to the spring plate 168 of the yoke assembly 150. In some embodiments, the actuation train 222 includes a forward portion 252 and an aft portion 254 that are pivotally connected about a pin 256 that defines an articulating joint 258 that rotates about a vertical axis 260. The articulating joint 258 may be in proximate alignment with the yoke pivot axis 154 of the yoke pin 152 when the tow bar 62 is in a towing (downward) configuration.

In operation, when the tow bar 62 is rotated upward from the towing configuration, the offset pivot 227 pulls the actuation train 222 in a forward direction 262, causing the brake bar 224 to translate forward so that the brake shoes 232 engage the treaded tires 132, thereby braking the high capacity cargo/container dolly 30. The release spring 240 is compressed against the bracket 238 when the tow bar is lowered to push the brake bar 224 and brake shoes 232 rearward, thereby releasing the brake assembly 64. The release spring 240 enables the aft portion 254 of the drive train 222 to slide and move within an oversized passage defined by the bracket 238 during release, which prevents the drive train 222 from binding within the bracket. The bracket 238 with its oversized passage and the release spring 240 also enables setting and releasing of the brake assembly 64 when the aft portion 254 passes through the bracket 238 at an angle, for example when the forward wheel and axle assembly 44 is in a turning configuration.

The compression spring 242 is sized to be compressed when the tow bar 62 is in the towing configuration, thereby applying a biasing force on the tow bar 62 that suspends the tow bar 62 above the ground and may also assist personnel with lifting the tow bar 62 into the braking configuration. The brake bar 224 and brake shoes 232 remain in the braking configuration as long as the tow bar 62 is upright. The tow bar 62 may include a latch 264 that engages the brake latch plate 172 of the yoke assembly 150, thereby maintaining the tow bar 62 in the upright position and the brake shoes 232 in contact with the treaded tires 132. The depicted embodiment portrays the brake assembly 64 as engaging the forward wheel and axle assembly 44. Alternatively or in addition, it is contemplated that the brake assembly 64 engage the rearward wheel and axle assembly 46 (FIG. 2) by moving or replicating the arrangement of the brake bar 224, brake shoes 232, bracket 238, and hangers 230 behind the rearward wheel and axle assembly 46 and extending the aft portion 254 to reach behind the rearward wheel and axle assembly 46.

The articulating joint 258 enables the actuation train 222 to conform to the yoke assembly 150 during steering of the high capacity cargo/container dolly 30. The hanger 166 of the yoke assembly 150 acts as a guide that causes the forward portion 252 of the actuation train 222 to rotate laterally with the yoke assembly 150. The articulated joint 258, being in proximate alignment with the yoke pivot axis 154, enables the aft portion 254 of the actuation train 222 to remain substantially aligned in the forward direction 262 during a turn. The coupling between the bracket 238 and the aft portion 254 include sufficient play to accommodate some misalignment of the aft portion 254 relative to the forward direction 262. For example, a passage in the bracket 238 through which the aft portion 254 passes may be oversized relative to a local diameter of the aft portion 254. The articulated joint 258 may also enable the brake assembly 64 to be actuated when the Ackerman steering mechanism 60 of the high capacity cargo/container dolly 30 is in a turning configuration. In some embodiments, the range of rotation of the yoke assembly 150, as defined by the slot 162 of the forward beam assembly 36, may be sufficiently limited to enable such actuation.

Figure 13:
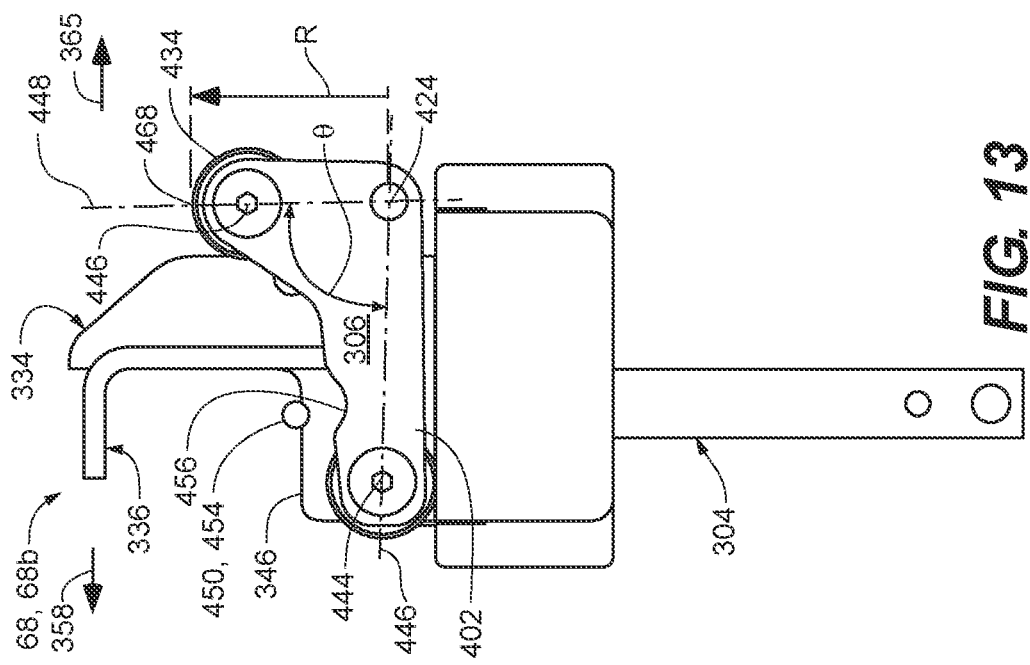
FIG. 13 is an elevational view of the internal components of the retractable side stop of FIG. 12 according to an embodiment of the disclosure.
Figure 12:
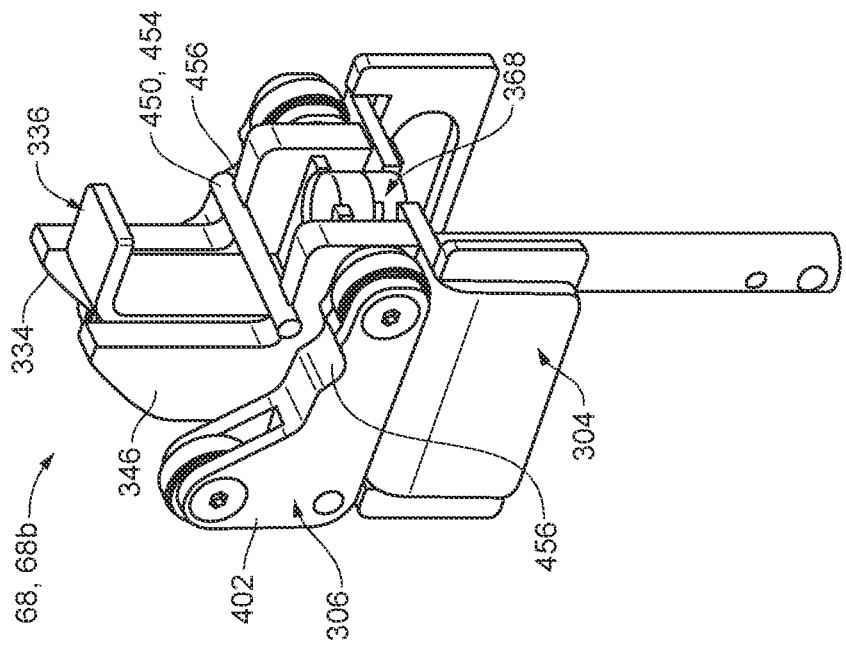
FIG. 12 is a front perspective view of internal components of a retractable side stop of according to an embodiment of the disclosure.

Referring to FIGS. 8 through 13, embodiments of the retractable side stop 68 are depicted in greater detail according to embodiments of the disclosure. Herein, embodiments of the retractable side stops 68 are referred to collectively or generically by reference character 68, with specific embodiments being referred to by reference character 68 followed by a letter suffix (e.g., retractable side stop 68a). Retractable side stop 68a is depicted in FIGS. 8 through 11, and retractable side stop 68b is depicted in FIGS. 12 and 13. It is understood that retractable side stops 68a and 68b share many of the same components and attributes, which are indicated with same-numbered reference characters, and that aspects of each may be combined with the other.

The retractable side stops 68 include a housing 302 that surrounds a plunger assembly 304 and a roller linkage assembly 306. In some embodiments, a stop bracket 308 is attached to the housing 302. In FIGS. 8 through 13, the retractable side stop 68 and plunger assembly 304 are depicted in a deployed configuration 310. The housing 302 includes one or more side walls 312 having a top end 314 and a bottom end 316. The housing 302 may further include a base 318 that depends from the bottom end 316. In some embodiments, the stop bracket 308 is attached to the side wall 312 and extends over the open top end 314 of the housing 302. The housing 302 may further include a spacer 322 attached to an exterior surface 324 of the side wall(s) 312. In the depicted embodiment, the housing 302 includes a square tubing 326 that presents four side walls 312. Other forms are contemplated, such as round tubing (presenting a single side wall) or other polygonal geometries (presenting more or less than four side walls).

In some embodiments, the plunger assembly 304, includes a platform assembly 332, a stop assembly 334, and a catch assembly 336. The platform assembly 332 may include tab portions 338 and guide plates 342 that depend from a platform portion 344. The stop assembly 334 is attached to and extends upward from the platform portion 344, and may include a pair of stop fingers 346 joined and separated by a lateral spacer 348. The stop fingers 346 include laterally inward faces 347 that face in a laterally inward direction 358 (i.e., parallel to the y-axis of the Cartesian coordinate 80 of FIG. 1 and toward the centerline 90 of the framework 32), the laterally inward faces 347 defining a vertical stop plane 349. The vertical stop plane 349 establishes the local lateral outward limit within which a cargo container is contained on the dolly 30 when the retractable side stops 68 are deployed.

In some embodiments, the catch assembly 336 includes a hook 352 that includes a shank portion 354 and a bend portion 356, the bend portion 356 extending from the shank portion 354 in the laterally inward direction 358. The catch assembly 336 is depicted in a capture configuration 350 in FIGS. 8 through 13, wherein the bend portion 356 extends beyond the vertical stop plane 349 in the laterally inward direction 358. The hook 352 extends upward from a lever 362, the lever 362 being attached to a pivot tube 364. The lever 362 includes a laterally inward portion 361 that extends from the pivot tube 364 in the laterally inward direction 358, and a laterally outward portion 363 that extends in a laterally outward direction 365 (i.e., parallel to the y-axis of the Cartesian coordinate 80 of FIG. 1 and away from the centerline 90 of the framework 32) from the pivot tube 364. The laterally inward portion 361 of the lever 362 extends underneath the stop bracket 308. The pivot tube 364 pivots about a pin or fastener 366 that is supported by and between the stop fingers 346. The catch assembly 336 may include a spring loaded cap assembly 368 coupled to the lever 362, the spring loaded cap assembly 368 and the hook 352 being coupled to the lever 362 on opposite sides of the pivot tube 364. The spring loaded cap assembly 368 includes a top portion 372 and a bottom portion 374 joined together by a spring 376. The top portion 372 is connected to the lever 362, and the bottom portion 374 is connected to the platform assembly 332.

The plunger assembly 304 includes a stem 378 that defines a stem axis 382, the stem 378 supporting and depending from the platform assembly 332. In some embodiments, a return spring 384 is disposed between the platform assembly 332 and the housing 302. In one non-limiting example, the return spring 384 is a coil spring 386 that is concentric about the stem 378 and is captured by and between the platform portion 344 of the plunger assembly 304 and the base 318 of the housing 302 (depicted). In some embodiments, a stop 388 is connected to or otherwise formed on the stem 378, the stop 388 being disposed below the housing 302.

In some embodiments, the roller linkage assembly 306 includes a pair of pivot arms 402 that straddle the stop and catch assemblies 334 and 336. In some embodiments, the pivot arms 402 are joined and separated by a spacer 404 and a pivot passage 406 is defined that passes through the pivot arms 402 and spacer 404. The pivot arms 402 may also be separated by a gusset 408. The roller linkage assembly 306 is supported by a pivot pin 422 (e.g., a fastener) that passes through the pivot passage 406, the pivot pin 422 being attached to and supported by the housing 302 and defining a linkage rotation axis 424 about which the roller linkage assembly 306 rotates. In some embodiments, the pivot arms 402 each include a lower roller 432 and an upper roller 434. Each of the rollers 432, 434 may be disposed in respective slotted portions 436, 438 and each being rotatable about an upper roller axis 442 and a lower roller axis 444, respectively. The axes 424, 442, and 444 may be parallel to each other.

The retractable side stop 68 may include an actuator member 450 for actively retracting the roller linkage assembly 306, instead of relying on a passive gravitational force. For the retractable side stop 68a, the lateral spacer 348 acts as the actuator member 450, being configured to interact with the spacer 404, for example by way of an extension tab 452 that extends from the spacer 404 in the laterally inward direction 358 and into a translation path 453 of the lateral spacer 348 (FIGS. 11 and 18-20). For the retractable side stop 68b, the actuator member 450 extends laterally beyond at least one of the stop fingers 346 of the stop assembly 334 and over at least one of the pivot arms 402 and may be in the form of, for example, a pin 454 (FIGS. 12 and 13). The pivot arm(s) 402 may include a cam surface 456 for engaging the actuation bar 454.

A first reference line 446 may be defined that passes through the lower roller axis 444 and the linkage rotation axis 424. Also, a second reference line 448 may be defined that passes through the upper roller axis 442 and the linkage rotation axis 424. The reference lines 446 and 448 are co-planar on a plane that is orthogonal to the linkage rotation axis 424. A non-zero angle θ may be defined about the linkage rotation axis 424 between the reference lines 446 and 448. An actuation radius R is defined from the linkage rotation axis 424 to an extremity 468 of the upper roller 434 along the second reference line 448.

Functionally, the housing 302, the tab portions 338, and the guide plates 342 cooperate to guide the plunger assembly 304 along the stem axis 382. That is, the lateral faces of the tab portions 338 and the ends of the guide plates 342 slide along interior surfaces of the housing 302 during actuation and return. The spacer 322 of the housing 302 is configured for mounting of the retractable side stop 68 to the framework 32. In some embodiments, the base 318 of the housing 302 acts to maintain the return spring 384 in compression. That is, the return spring 384 may be sized and dimensioned to be in compression between the platform assembly 332 and the housing 302 when the stop 388 is registered against the housing 302, thereby exerting an upward return force FR on the plunger assembly 304 to extend the roller linkage assembly 306, the stop assembly 334, and the catch assembly 336 at least partially above the housing 302. The base 318 and stop 388 may also cooperate to define an upper limit of the stroke of the plunger assembly 304.

The stop fingers 346 act to prevent a cargo container 370 (FIG. 14) from sliding laterally over the side beam assembly 24 to which the retractable side stop 68 is mounted. The catch assembly 336 captures a flange 371 of the cargo container 370 and prevents the container 370 from rising over the retractable side stop 68 during transport. The stop bracket 308 contacts and holds the lever 362 down when the plunger assembly 304 is in the deployed configuration 310. By holding the lever 362 down, the catch assembly 336 is maintained in the capture configuration 350. The spring loaded cap assembly 368 applies a biasing force FB that biases the lever 362 upward and away from the platform assembly 332 to rotate the hook 352 in the laterally outward direction 365 when the plunger assembly 304 is retracted away from the stop bracket 308. The roller linkage assembly 306 functions to passively retract the plunger assembly 304 when a container is slid over the retractable side stop 68 from the outside, as explained below attendant FIGS. 26 through 28.

Referring to FIGS. 14 through 17, active, operator-selectable operation of the retractable side stop 68, is depicted according to an embodiment of the disclosure. While retractable side stop 68a is depicted in FIGS. 14 through 17, the attendant discussion applies to the retractable side stop 68b as well. In a fully engaged configuration 470 (FIGS. 14 and 15), the retractable side stop 68 is in the deployed configuration 310, with the catch assembly 336 in the capture configuration 350 to capture the cargo container 370. In this way, the cargo container 370 is constrained laterally on the framework 32 and has limited vertical movement. The bottom of the cargo container 370 rides on a plurality of swivel casters 472 having upper extremities 474 that are coplanar with a registration plane 476.

In the deployed configuration 310, the roller linkage assembly 306, the stop assembly 334, and the catch assembly 336 extend upward, through the registration plane 476. Also, the registration plane 476 intersects the vertical stop plane 349 along an intersection line 477. The intersection line 477 may be generally parallel to the centerline 90, and represents an extreme corner below and laterally outside of which containers or other cargo generally do not extend.

To release the cargo container 370, a downward axial force FA is exerted on the stem 378, for example with the retraction mechanism assembly 72 as described below attendant to FIGS. 29 through 31. The downward axial force FA causes the plunger assembly 304 to translate axially downward, relative to and guided by the housing 302. As the plunger assembly 304 translates axially downward, the laterally inward portion 361 of the lever 362 pulls away from the stop bracket 308, so that the biasing force FB exerted by the spring loaded cap assembly 368 rotates the hook 352 in the laterally outward direction 365 and into a release configuration 478 (FIG. 16). In the release configuration 478, the bend portion 356 of the hook 352 is rotated in the laterally outward direction 365, beyond the vertical stop plane 349 defined by the laterally inward faces 347 of the stop fingers 346. In some embodiments, the laterally outward rotation of the hook 352 is limited by the lateral spacer 348 of the stop assembly 334, which engages the shank portion 354 of the hook 352. In the release configuration 478, because the bend portion 356 of the hook 352 is laterally outward of the vertical stop plane 349, the plunger assembly 304 can continue translating axially downward without interference from the cargo container 370.

As the plunger assembly 304 translates axially downward, roller linkage assembly 306, which is mounted to the (stationary) housing 302, rotates about the linkage rotation axis 424, primarily due to gravity. The rotation causes the upper rollers 434 to arc along the actuation radius R and rotate below the registration plane 476 (FIG. 17). In some embodiments, the actuation radius R is dimensioned so that the upper rollers 434 rotate below the registration plane 476 before passing through the vertical stop plane 349. In this way, the upper rollers 434 are assured to pass under and not collide with the cargo container 370 during retraction of the retractable side stop 68.

Figures 16A, 16B:
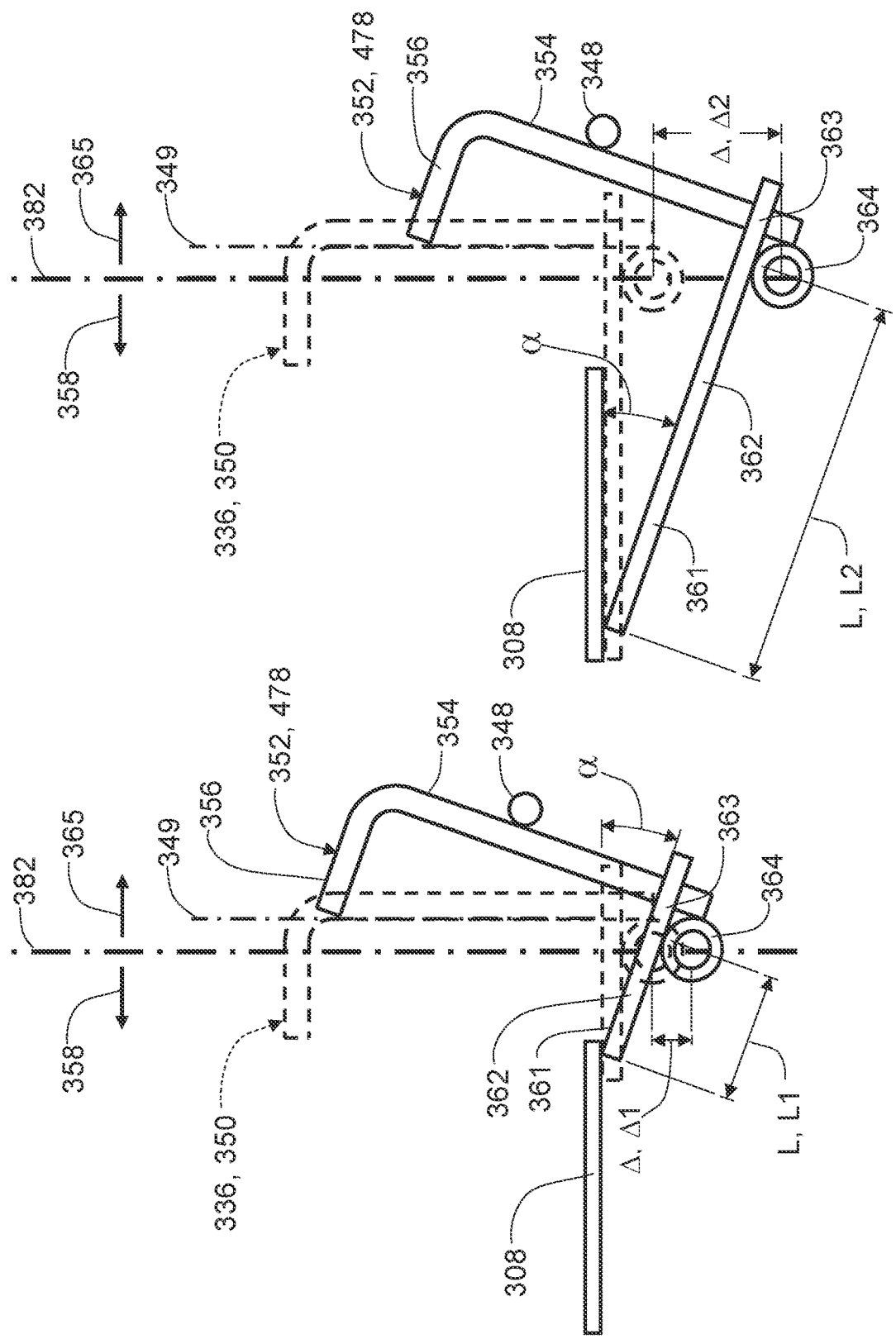
FIG. 16A is an isolated view of select components of FIG. 16 depicting a minimum downward vertical displacement requirement to attain a release configuration according to an embodiment of the disclosure.
FIG. 16B is an isolated view of the components of FIG. 16A modified to provide a greater minimum downward vertical displacement to attain the release configuration according to an embodiment of the disclosure.

Referring to FIGS. 16A and 16B and again to FIG. 16, a minimum downward vertical displacement Δ required to configure the catch assembly 336 in the release configuration 478 is illustrated according to an embodiment of the disclosure. Here, the hook 352, lever 362, pivot tube 364, and a contacting portion of the stop bracket 308 of the catch assembly 336 of FIG. 16 is depicted in isolation in FIGS. 16A and 16B. In FIG. 16, the laterally inward portion 361 of the lever 362 is still in contact with the stop bracket 308 as the hook 352 rotates into contact with the lateral spacer 348, such that the catch assembly 336 ceases rotation and undergoes pure axial translation along the stem axis 382 and away from the stop bracket 308. That is, FIG. 16 represents minimum downward vertical displacement Δ of downward axial translation of the plunger assembly 304 required to attain the release configuration 478.

Isolation of the components of FIGS. 16A and 16B depicts how the minimum downward vertical displacement Δ may be governed by a length of the laterally inward portion 361 of the lever 362 having a lateral dimension L in the laterally inward direction 358. Herein, the "lateral dimension" is a dimension of a length parallel to the lateral direction (i.e., parallel to the y-axis of Cartesian coordinate 80 of FIG. 1). A first lateral dimension L1 for the laterally inward portion 361 results in a first required minimum downward vertical displacement Δ1, while a second lateral dimension L2 results in a second required minimum downward vertical displacement Δ2. The required minimum downward vertical displacement Δ is directly proportional to the lateral dimension L of the laterally inward portion 361 of the lever 362. In the illustrations of FIGS. 16A and 16B, lateral dimension L2 is greater than lateral dimension L1, so that the required minimum downward vertical displacement Δ2 is greater than the required minimum downward vertical displacement Δ1. A rotation angle α is determined by the interaction of the hook 352 with the lateral spacer 348 and is the same regardless of the lateral dimension L of the laterally inward portion 361.

Figure 14:
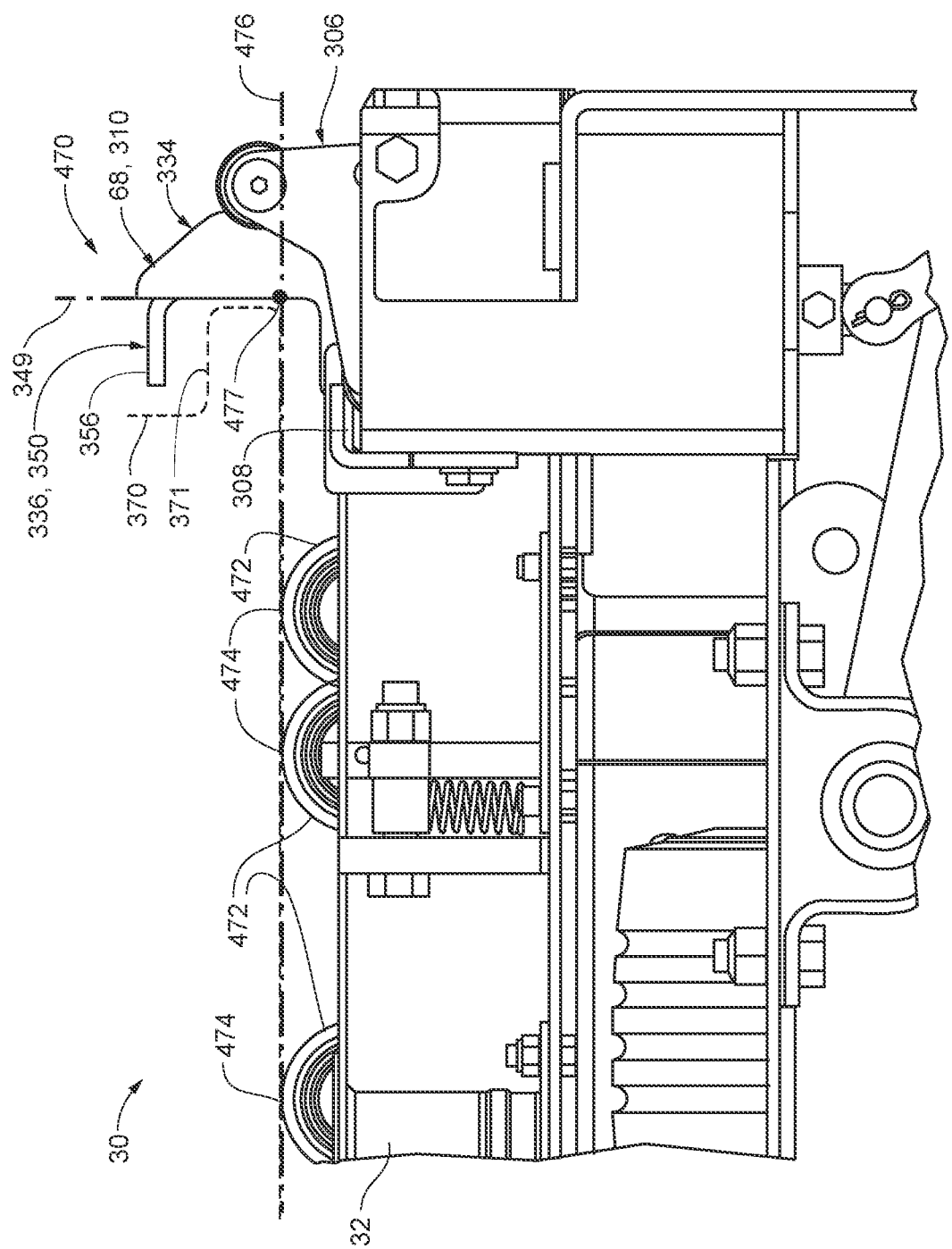
FIG. 14 is an enlarged, partial elevational view of the retractable side stop of FIG. 8 installed on the high capacity cargo/container dolly of FIG. 1 according to an embodiment of the disclosure.

Heretofore, conventional designs of retractable side stops typically focus on quick release of cargo containers (i.e., short minimum downward vertical displacements A). Advantages of a quick release include a small amount of stroke for the plunger assembly 304 to attain the release configuration, as well as a shorter clearance requirement between the flange 371 of the cargo container 370 and the bend portion 356 of the hook 352 (FIG. 14). Accordingly, conventional designs are typically configured to provide a minimum downward vertical displacement Δ on the order of 6 to 10 millimeters (about ¼- to ⅜-inches).

We have found, however, that short minimum downward vertical displacements are prone to inadvertent release during the rigors of transport. Jostling and jolting of cargo dollies over uneven terrain or when encountering low clearance obstacles can cause dynamic loads that in turn cause the plunger assemblies of conventional retractable side stops to deflect enough to cause the catch assemblies to momentarily release. Such spurious release occurs at an instant in time when the catch assemblies are needed most to contain the cargo. As a result, the cargo can inadvertently become unmoored from the cargo dolly during transport.

As a remedy, some embodiments of the disclosure are configured with the lateral dimension L of the laterally inward portion 361 of the lever 362 of the catch assembly 336 to provide the minimum downward vertical displacement Δ that is in a range of 15 to 38 millimeters (i.e., ⅝- to 1½-inches) inclusive. In some embodiments, the minimum downward vertical displacement Δ is in a range of 18 to 25 millimeters (i.e., ¾- to 1-inches) inclusive. Herein, a range that is said to be "inclusive" includes the endpoint values of the range as well as all values between the endpoints. We have found, after rigorous testing, that retention of cargo containers 370 when using retractable side stops 68 designed with minimum downward vertical displacements A that fall within these ranges is significantly improved over conventional quick release retractable side stops.

Referring to FIGS. 18 through 20, operation of the actuator 450 of retractable side stop 68a for active rotation of the roller linkage assembly 306 below the registration plane 476 is depicted according to an embodiment of the disclosure. The extension tab 452 extends from the spacer 404 of the roller linkage assembly 306 in the laterally inward direction 358 and into the translation path 453 of the actuation member 450 (e.g., the lateral spacer 348 of the stop assembly 334). If the gravitational force is inadequate to cause the roller linkage assembly 306 to rotate below the registration plane 476, the actuation member 450 (lateral spacer 348) can collide with the extension tab 452 when translated along the translation path 453 during the retraction of the plunger assembly 304 (FIG. 18). The collision forces the roller linkage assembly 306 to rotate about the rotation axis 424 of the pivot pin 422 (FIG. 19). In the event that gravitational forces are inadequate to overcome the static friction between the pivot pin 422 and the pivot passage 406, the collision and forced rotation overcomes the static friction, enabling the roller linkage assembly 306 to complete its rotation under the influence of gravity (FIG. 20).

Referring to FIGS. 21 through 23, operation of the actuator 450, 454 of retractable side stop 68b for active rotation of the roller linkage assembly 306 below the registration plane 476 is depicted according to an embodiment of the disclosure. Because the actuation member 450 (e.g., the actuation bar or pin 454) extends laterally beyond the vertical stop plane 349, the actuation member 450 (pin 454) can engage the pivot arm(s) 402 if the gravitational force is inadequate to rotate the roller linkage assembly 306 downward, forcing the roller linkage assembly 306 to rotate about the rotation axis 424 of the pivot pin 422. The actuation member 450, 454 may slide along the pivot arm(s) 402 (e.g., along the cam surface 456) at least until the upper roller 434 is actively positioned below the registration plane 476. The cam surface 456 may be recessed to assure that the rotation of the pivot arms 402 lag or follow the downward axial translation of the plunger assembly 304. In this way, the actuation pin 454 doesn't force the pivot arms 402 against the platform portion 344 during the downward axial translation of the plunger assembly 304, thereby preventing undue stresses on the actuation pin 454, the pivot arms 402, and the retractable side stop 68b generally.

Accordingly, a retracted configuration 479 of the retractable side stop 68 is defined when the stop assembly 334 and the catch assembly 336 are translated below the registration plane 476, and the roller linkage assembly 306 is rotated below the registration plane 476 (e.g., FIGS. 20 and 23). In the retracted configuration 479, the cargo container 370 can be rolled off the high capacity cargo/container dolly 30 without interference from the retractable side stop 68.

Figure 24:
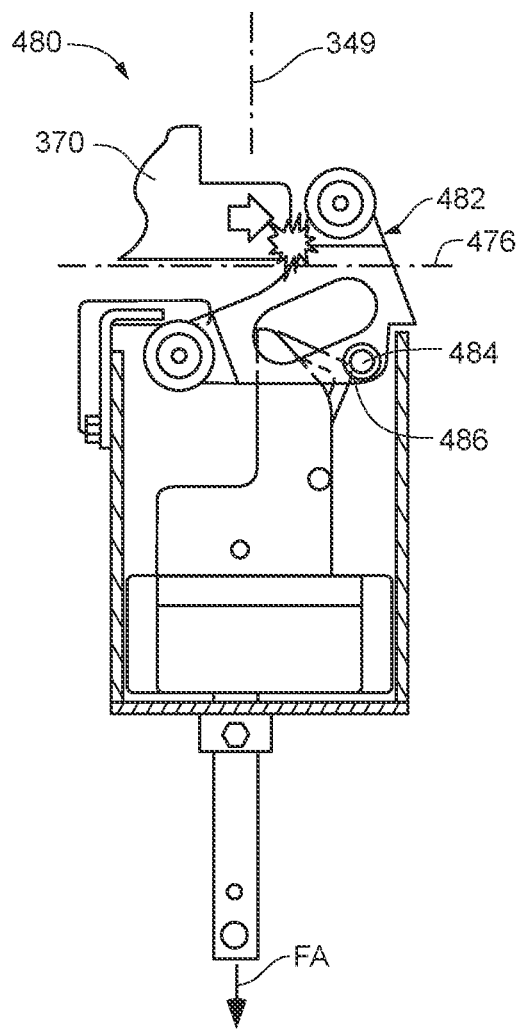
FIG. 24 is a partial sectional view of a conventional retractable side stop experiencing a hang-up malfunction.
Figure 25:
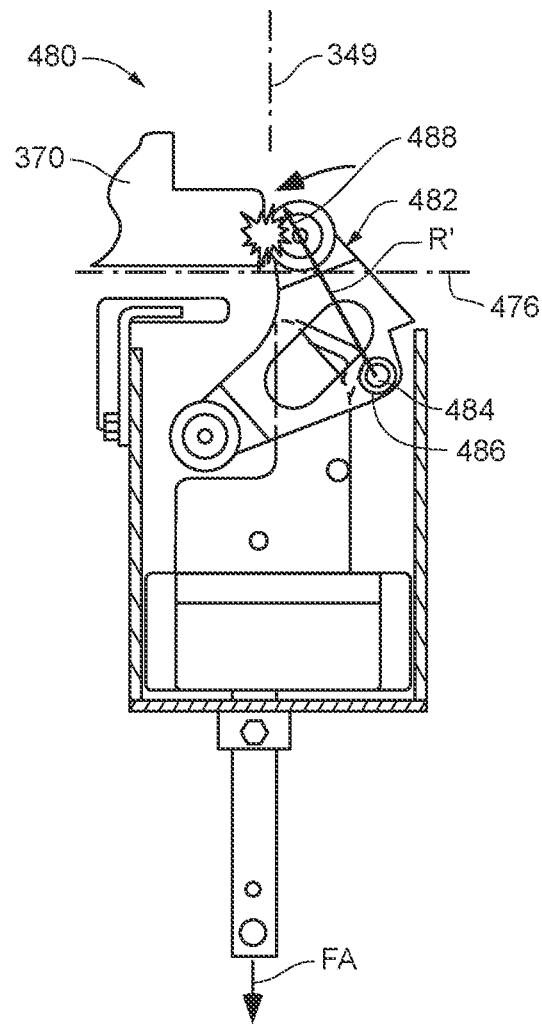
FIG. 25 is a partial sectional view of a conventional retractable side stop experiencing a hold-up malfunction.

Referring to FIGS. 24 and 25, the advantages of the retractable side stop 68 in reference to a conventional retractable side stop 480 is explained. The conventional retractable side stop 480 includes a conventional roller linkage assembly 482 that rotates about a pivot pin 484. The conventional retractable side stop 480 relies solely on passive gravitational forces to rotate the conventional roller linkage assembly 482 below the registration plane 476, and thus relies on a low friction interface 486 between the pivot pin 484 and the roller linkage assembly 482. Over time, the friction may increase, for example due to corrosion or the lodging of debris at the interface 486. This can cause the conventional roller linkage assembly 482 to "hang up," i.e., not rotate completely below the registration plane 476 (FIG. 24). If there is such a hang up, the conventional roller linkage assembly 482 may interfere with the offloading of the cargo container 370 over the conventional retractable side stop 480. By actively rotating the roller linkage assembly 306 of the retractable side stop 68, the hazard of linkage assembly hang up is reduced or eliminated.

Also, the conventional roller linkage assembly 482 of the conventional retractable side stop 480 often has an upper extremity 488 that defines a conventional actuation radius R' that arcs through the vertical stop plane 349 above the registration plane 476. Accordingly, if the cargo container 370 is at or proximate the vertical stop plane 349 when the conventional retractable side stop 480 is retracted, the conventional roller linkage assembly 482 can rotate into and be "held up" by the cargo container 370 (FIG. 25). In such a scenario, the conventional roller linkage assembly 482 may also interfere with the offloading of the cargo container 370 over the conventional retractable side stop 480. By sizing the pivot arms 402 of the roller linkage assembly 306 so that the actuation radius R does not swing through the vertical stop plane 349 above the registration plane 476 (FIG. 17), the roller linkage assembly 306 cannot be held up by the cargo container 370, thereby mitigating this hazard.

Referring to FIGS. 26 through 28, the function of the roller linkage assembly 306 is depicted according to embodiments of the disclosure. While FIGS. 26 through 28 depict the retractable side stop 68b, the discussed aspects of the roller linkage assembly 306 also applies generally to the retractable side stop 68a, except where specifically noted. When an object 498 such as a cargo container approaches the retractable side stop 68 along the registration plane 476 and in the laterally inward direction 358 from the outside of the high capacity cargo/container dolly 30, the object 498 first encounters the upper roller 434 of the roller linkage assembly 306 (FIG. 26). As the object 498 slides over the retractable side stop 68, a lateral force FL exerted on the upper roller 434 causes the roller linkage assembly 306 to rotate about the rotation axis 424 of the pivot pin 422. The rotation of the roller linkage assembly 306 causes a downward force FD to be exerted on the platform assembly 332 of the plunger assembly 304, thereby overcoming the upward return force FR exerted on the plunger assembly 304 by the return spring 384. The downward force FD causes the plunger assembly 304 to retract within the housing 302, with the attendant downward axial translation of the stop assembly 334 (FIG. 27) and the catch assembly 336. In some embodiments, the lower roller 432 rolls along the platform portion 344 of the platform assembly 332 to facilitate a low friction coupling between the roller linkage assembly 306 and the platform assembly 332 as the plunger assembly 304 is pushed downward by the roller linkage assembly 306. For the retractable side stop 68b, the recess of the cam surface 456 may prevent collision between the actuation member 450 and the pivot arm(s) 402 of the roller linkage assembly 306 during the actuation of the plunger assembly 304 by the roller linkage assembly 306. As the object 498 progresses over the retractable side stop 68, the stop assembly 334 and the catch assembly 336 are fully retracted below the registration plane 476, enabling unimpeded passage of the object 498 over the retractable side stop 68 (FIG. 28).

Figure 29:
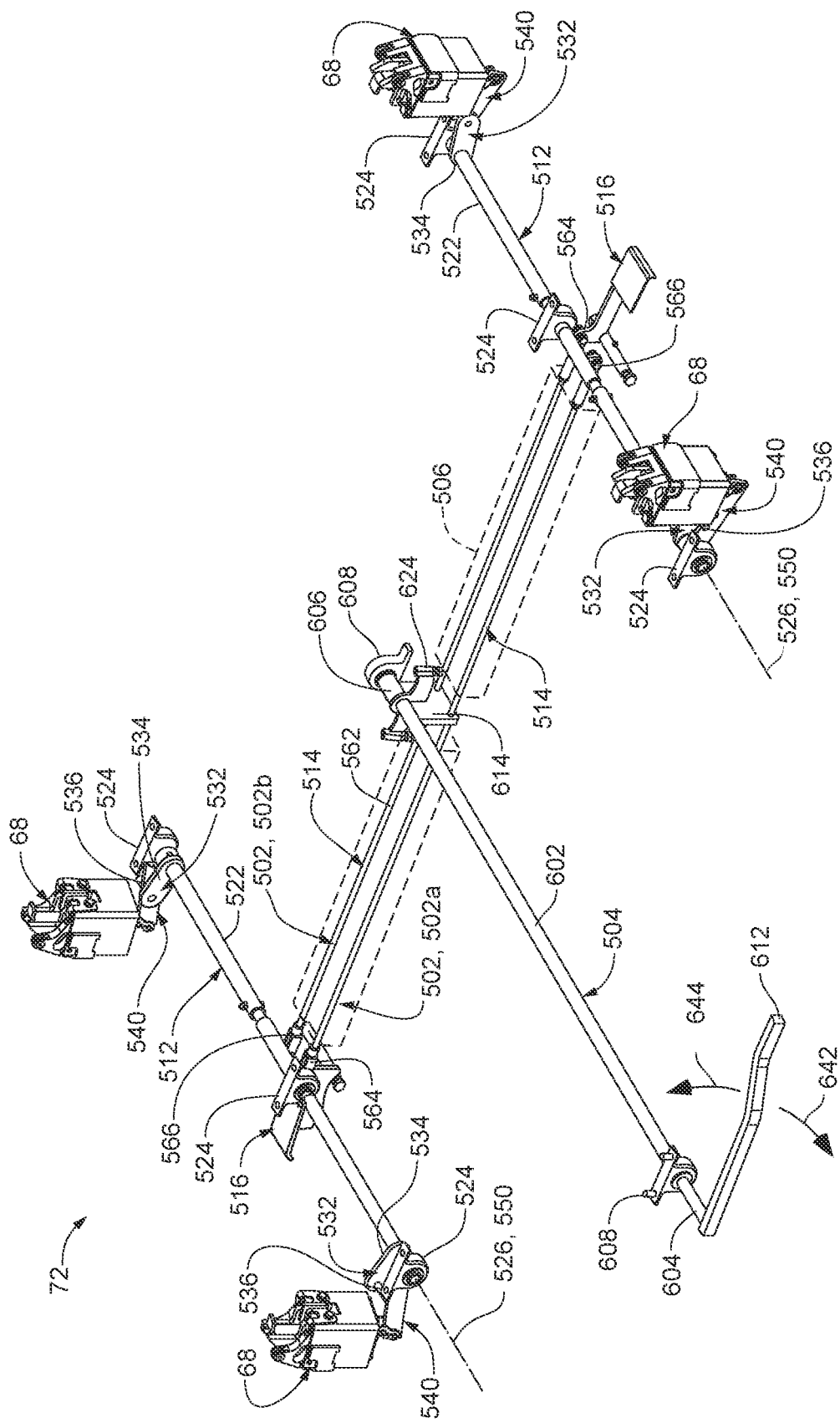
FIG. 29 is an isolated, upper perspective view of a retraction mechanism assembly coupled to a plurality of retractable side stops according to an embodiment of the disclosure.
Figure 30:
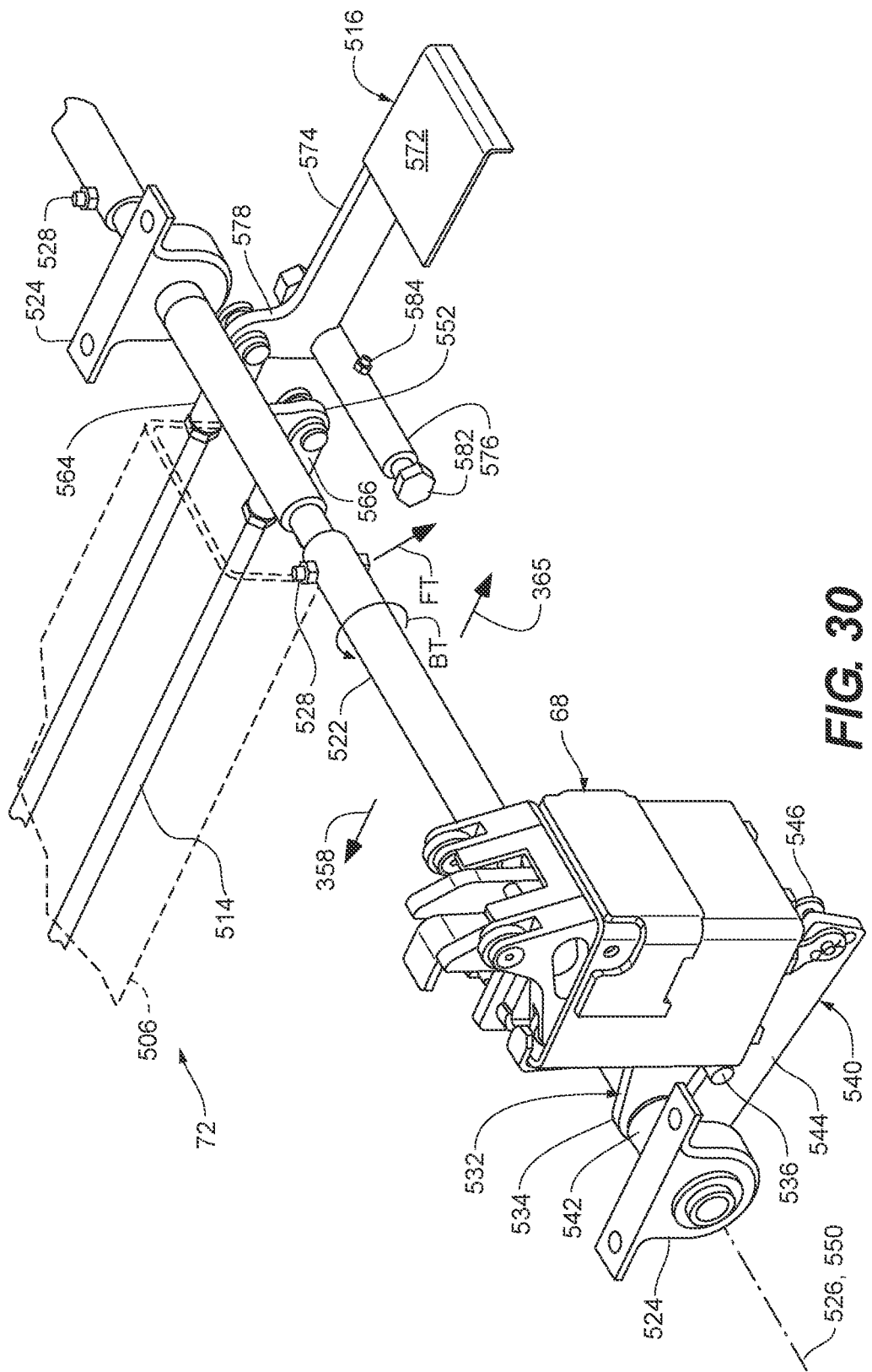
FIGS. 30 and 31 are enlarged, partial views of the retraction mechanism assembly of FIG. 29 according to an embodiment of the disclosure.
Figure 31:
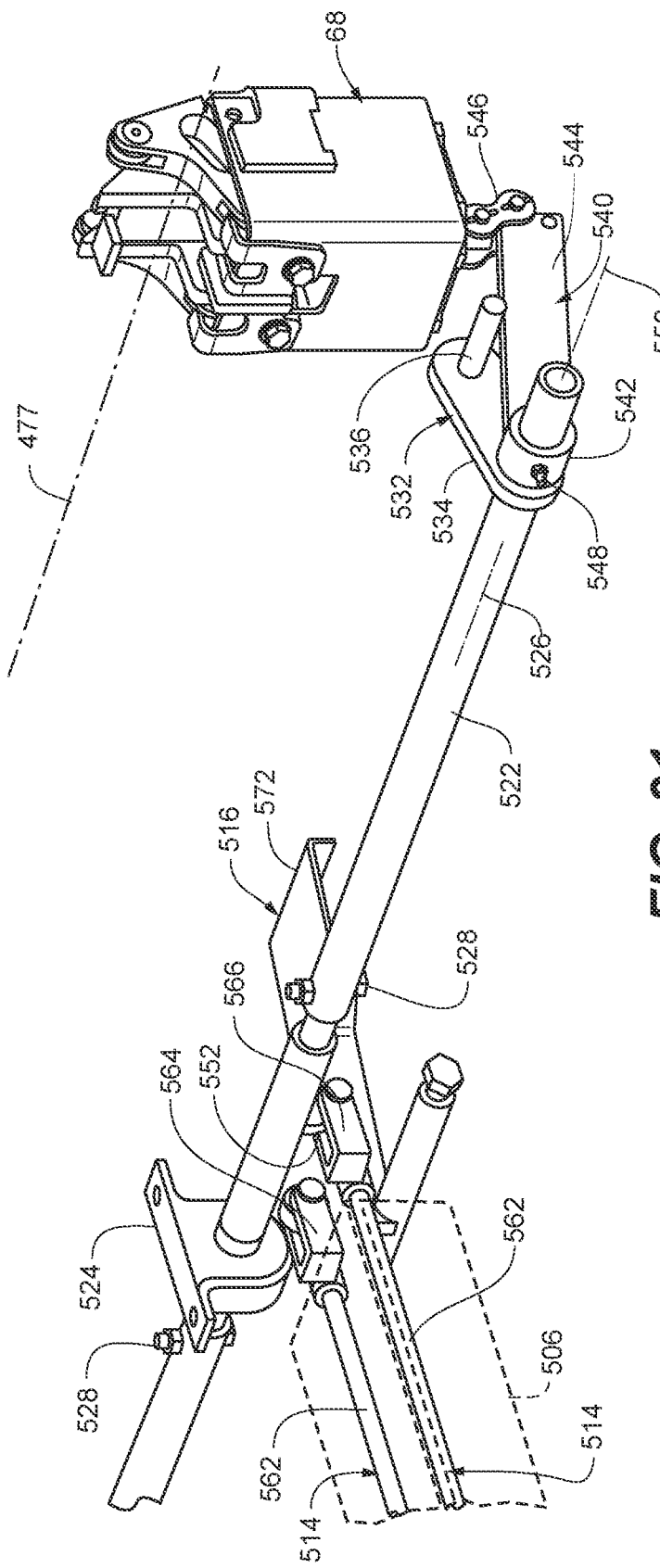

Referring to FIGS. 29 through 31, the retraction mechanism assembly 72 for active, operator-selected operation of the retractable side stops 68 is depicted in greater detail according to an embodiment of the disclosure. The retraction mechanism assembly 72 includes two foot actuated retraction mechanisms 502a and 502b, each coupled to at least one respective retractable side stop 68. The foot actuated retraction mechanisms 502a, 502b are referred to collectively or generically with reference character 502. The foot actuated retraction mechanisms 502 are accessible from opposing side beam assemblies 42. That is, the foot actuated retraction mechanism 502a is accessible from side beam assembly 42a to retract retractable side stop(s) 68 that are mounted to or proximate side beam assembly 42b, and the foot actuated retraction mechanism 502b is accessible from side beam assembly 42b to retract retractable side stop(s) 68 that are mounted to or proximate side beam assembly 42a (FIG. 2). The foot actuated retraction mechanisms 502 may pass through one or more structural tubes 506 depicted in phantom in FIGS. 29 through 30. In some embodiments, an auxiliary retraction mechanism 504 extends axially, substantially perpendicular to the foot actuated retraction mechanisms 502. In some embodiments, the auxiliary retraction mechanism 504 is hand actuated.

Each foot actuated retraction mechanism 502 includes a rotation linkage assembly 512, a lineal linkage assembly 514, and an actuation pedal assembly 516. Each rotation linkage assembly 512 includes a rotatable shaft 522 suspended by pillow blocks 524 and bi-directionally rotatable about a rotation axis 526. The rotatable shaft 522 may include sections of rod and tube held together by fasteners 528. In some embodiments, cam arms 532 are mounted to and in fixed relation with the rotatable shaft 522. The cam arms 532 may include a radially extending member 534 with a cam rod 536 that extends perpendicular thereto. In some embodiments, an actuation linkage 540 is mounted to the rotatable shaft 522, the actuation linkage 540 including a collar 542, an arm 544 such as a bar or rod extending from the collar 542, and a coupler 546 (such as the depicted chain link) affixed to and between the arm 544 and plunger assembly 304. The collar 542 defines a rocker axis 550 that is concentric with the rotation axis 526 of the rotatable shaft 52 and about which the collar 542 and arm 544 rotate. The collar 542 is sized to enable the rotatable shaft 522 to rotate freely therein. In some embodiments, the collar 542 includes a grease zerk fitting 548 for facilitating lubrication of the collar 542 about the rotatable shaft 522. In some embodiments, an offset pivot 552 extends from the rotatable shaft 522.

In some embodiments, the lineal linkage assembly 514 includes a rod 562 having a proximal yoke 564 and a distal yoke 566 coupled to opposing ends thereof. The proximal yoke 564 is pivotally coupled to the actuation pedal assembly 516, and the distal yoke 566 is pivotally mounted to the offset 552 of the rotation linkage assembly 512. The actuation pedal assembly 516 may include a foot pad 572 attached to a lever arm 574, the lever arm 574 being mounted to a pivot tube 576 and including an offset pivot 578 that extends from the pivot tube 576. In some embodiments, the pivot tube 576 rotates about a support 582 (e.g., a fastener) that is mounted to the framework 32. The pivot tube 576 may include a grease zerk fitting 584 for lubricating the pivot tube 576 about the support 582.

In some embodiments, the actuation pedal assembly 516 is accessible through the sides of the side beam assemblies 42. An access notch 592 is formed in each side beam assembly 42 and a reinforcement housing 594 fitted and welded into the notch 592 (FIG. 1). Similarly, the stringers may also be formed with notches 596 and the structural tubes 506 welded into the notches 596 (FIG. 2).

Figure 2A:
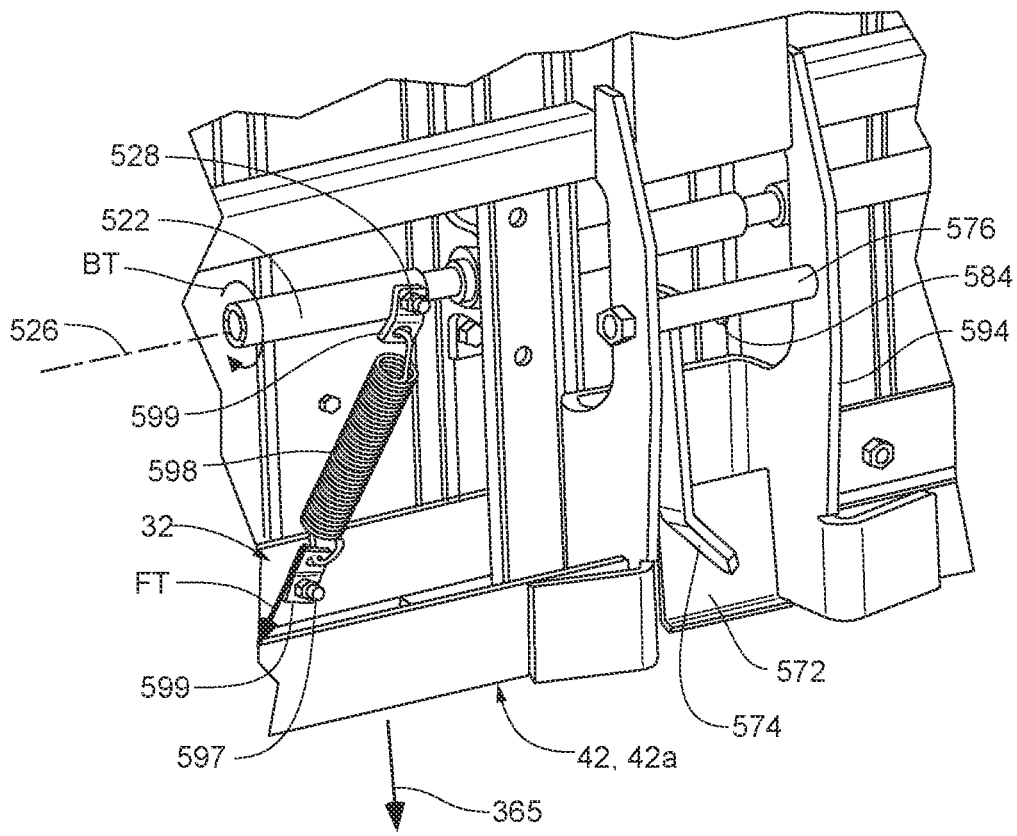
FIG. 2A is partial, enlarged view of FIG. 2 according to an embodiment of the disclosure.

In some embodiments, a torque return spring 598 is coupled to the rotatable shaft 522 in a manner that applies a biasing torsion BT to the rotatable shaft 522 (FIG. 2A). The biasing torsion BT acts to apply a torque that helps maintain the rotatable shaft 522 in a non-actuated orientation (i.e., foot pad 572 and lever arm 574 in an elevated orientation within the reinforcement housing 594). In the depicted embodiment, the torque return spring 598 is coupled on one end to the bottom of one of the fasteners 528 (FIG. 2A) and to a panel fastener 597 on the other end to apply a tangential linear torsion force FT (FIGS. 2A and 30) in the laterally outward direction 365 to effect the biasing torsion BT about the rotation axis 526. The torque return spring 598 may be fitted with anchor tabs 599 to secure the return spring 598 to the fasteners 528, 597. While the depicted embodiment presents a linear spring applying a tangential linear torsion force FT to the rotatable shaft 522 to generate the biasing torsion BT, other forms of generating the biasing torsion BT on the rotatable shaft 522 are contemplated, including a torsion spring concentric about the rotation axis 526 or about a rotation axis of the pivot tube 576.

Figure 31A:
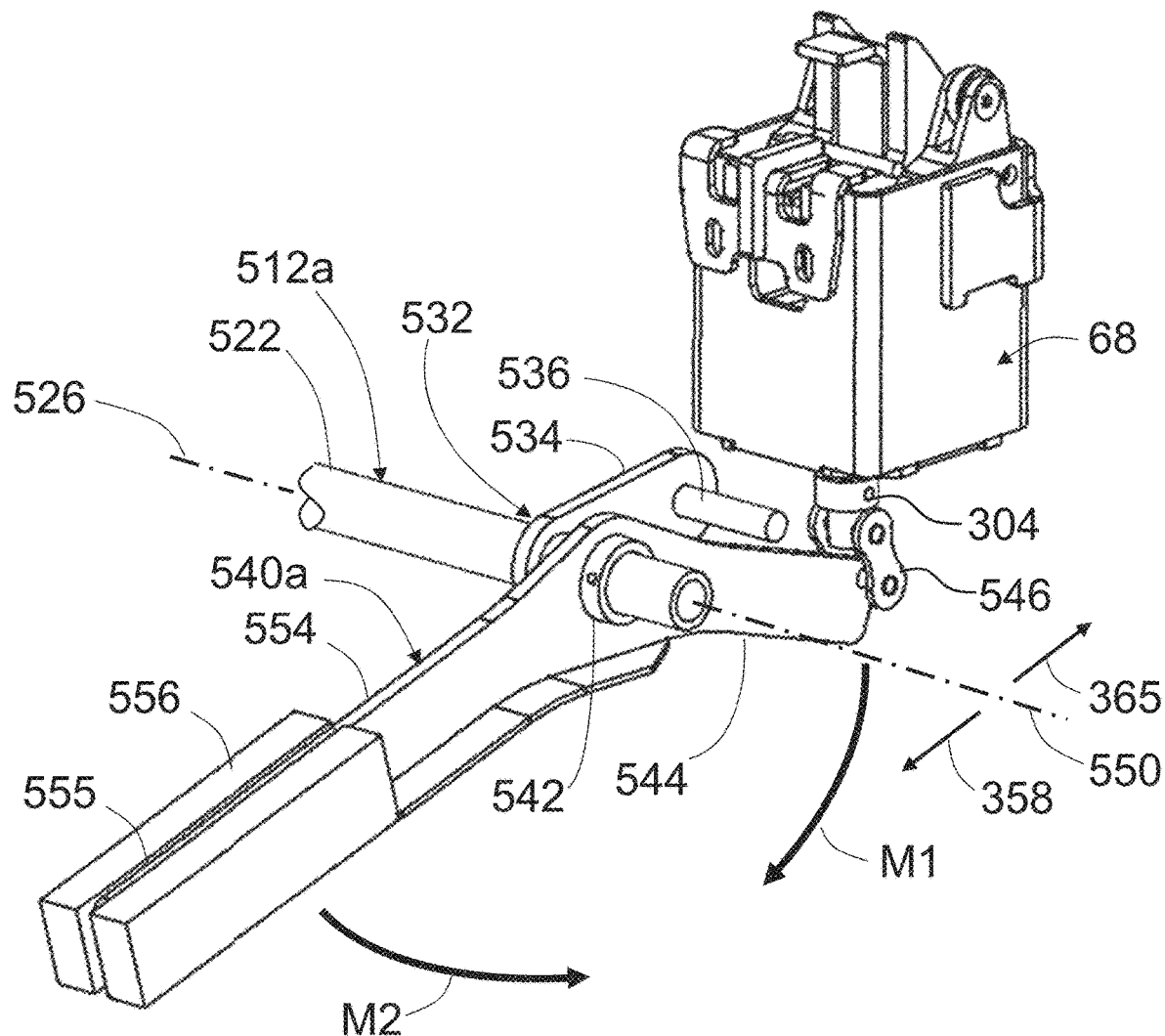
FIG. 31A is a partial view of the retraction mechanism of FIG. 31 modified to include a counterbalance weight to counter dynamic loads according to an embodiment of the disclosure.

Referring to FIG. 31A, a rotation linkage assembly 512a having a counterbalanced actuation linkage 540a is depicted according to an embodiment of the disclosure. The rotation linkage assembly 512a and actuation linkage 540a include many of the same components and attributes as the rotation linkage assembly 512 and actuation linkage 540, which are indicated with same-numbered reference characters. The actuation linkage 540a includes the first arm 544 affixed to the collar 542 and extending in the laterally outward direction 365 from the rocker axis 550, as well as a second arm 554 affixed to the collar 542 that extends in the laterally inward direction 358 from the rocker axis 550 to a free end 555. Accordingly, the first and second arms 544 and 554 extend in generally opposing lateral directions. The first arm 544 is coupled to the plunger assembly 304 with the coupler 546 (such as the depicted chain link). A counterweight 556 is affixed to the second arm 554 at the free end 555. In some embodiments, the second arm 554 and the counterweight 556 are unitary.

Functionally, the counterbalanced actuation linkage 540a prevents spurious release of the retractable side stops 68 when the high capacity cargo/container dolly 30 is in transit. The counterweight 556 and the second arm 554 may be tailored to counter dynamic loads exerted on the plunger assembly 304 during impact loads generated by vertical displacements as the high capacity cargo/container dolly 30 travels over uneven terrain or when encountering low clearance obstacles. Such dynamic loads include the inertial or momentum forces of the retractable components within the retractable side stops 68 (e.g., the plunger assembly 304 and, to some extent, the roller linkage assembly 306) as well as the inertial moments generated by the rotation linkage assembly 512a and actuation pedal assembly 516 which are exerted on the plunger assembly 304 via the rotation linkage assembly 512a. These inertial forces generate a system inertial moment M1 about the rocker axis 550 (depicted clockwise in FIG. 31A). Simultaneously, the same displacements cause the second arm 554 and the counterweight 556 to generate a countering inertial moment M2 about the rocker axis 550 (depicted counterclockwise in FIG. 31A) that counters the system inertial moment M1. The counterweight 556 and the second arm 554 may be sized and dimensioned so that the countering inertial moment M2 substantially or completely cancels the system inertial moment M1, thereby preventing the dynamic load from retracting and releasing the retractable side stop 68.

Figure 32A:
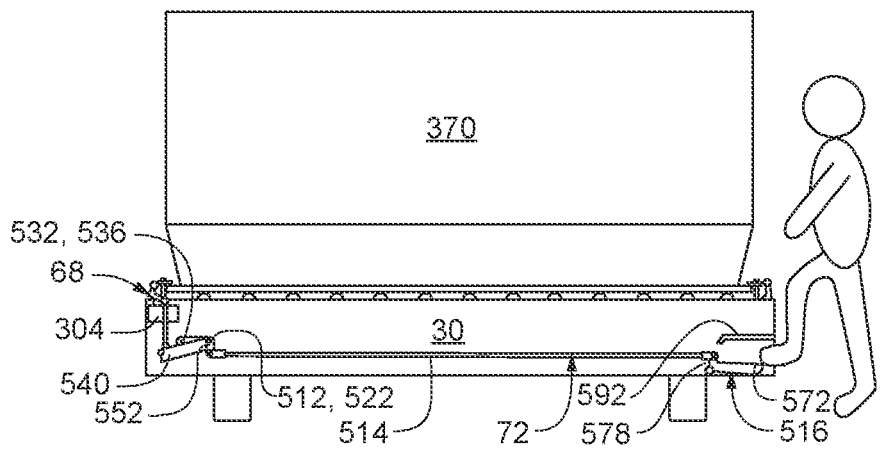
FIGS. 32A through 32C are elevational views depicting operation of the retraction mechanism assembly of FIG. 29 according to an embodiment of the disclosure.
Figure 32B:
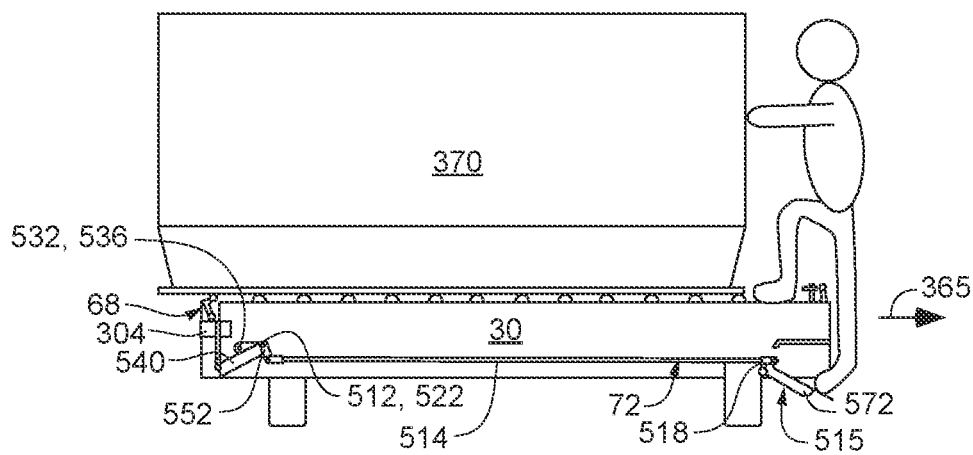
Figure 32C:
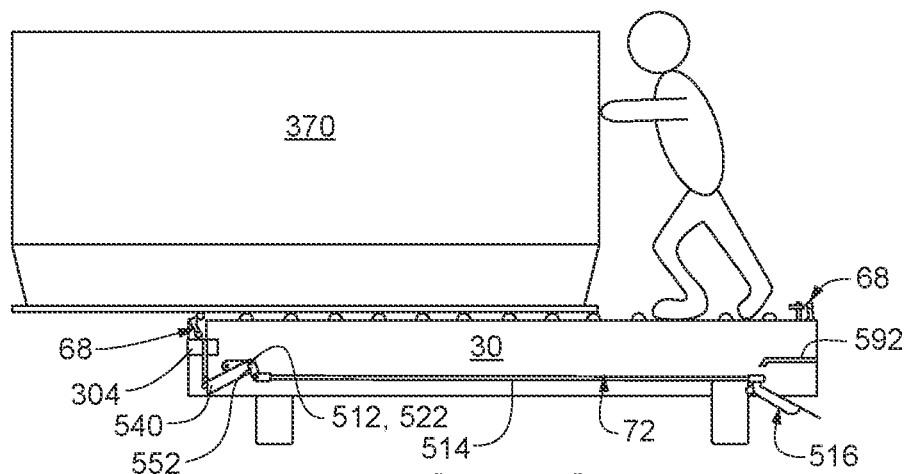

Referring to FIGS. 32A through 32C, operation of the retraction mechanism assembly 72 is depicted according to an embodiment of the disclosure. An operator inserts a foot into the access notch 592 (FIG. 32A) and depresses the actuation pedal assembly 516 by pushing down on the foot pad 572 with the foot (FIG. 32B). This causes the offset pivot 578 to rotate in the laterally outward direction 365, thereby laterally translating the lineal linkage assembly 514 toward the operator and away from the rotation linkage assembly 512. The lateral translation of the lineal linkage assembly 514 pulls on the offset 552 of the rotation linkage assembly 512, causing the rotation linkage assembly 512 to rotate about the rotation axis 526, which causes the cam arms 532 to rotate and the cam rods 536 to bear down on and exert a force on the actuation linkage 540. The collars 542 of the actuation linkages 540 rotate downward about the rotatable shaft 522 to translate the plunger assemblies 304 of the retractable side stops 68 downward and retract the retractable side stops 68.

Functionally, the foot actuated retraction mechanisms 502 enable personnel to retract retractable side stops 68 from an opposite side of the dolly 30. This enables the personnel to retract the side stops 68 with the foot pad 572 and push a pallet or cargo container 370 over the retracted stops 68 from the opposite side of the high capacity cargo/container dolly 30 while the foot pad 572 is depressed (FIG. 32B). When the foot pad 572 is released, the return spring 384 of the retractable side stops 68 cause the upper rollers 434 of the roller linkage assemblies 306 to engage the bottom surface of the cargo container, maintaining the retractable side stops 68 in the retracted configuration 479 while enabling the cargo container to roll freely over the retractable side stops 68. Accordingly, operating personnel need only depress the foot pad 572 initially, until the cargo container is pushed over the retractable side stop 68. There is no need to hold down the foot pad 572 thereafter, enabling operating personnel to step away from the foot pad 572 as they push the cargo container off the high capacity cargo/container dolly 30 (FIG. 32C).

The torque return spring 598 may assist in returning the foot pad 572 to the unactuated orientation. However, the primary purpose of the torque return spring 598 is to resist or counter dynamic loads on the plunger assembly 304 during transport of the high capacity cargo/container dolly 30. The spring 598 acts on the rotation linkage assembly which in turn acts on the plunger assembly 304. The rotation linkage assembly 512 includes several components that impose a moment on the rotatable shaft 522 toward actuation. Those components include the foot pad 572, lever arm 574, and cam arms 532, all of which extend laterally outward from the rotatable shaft 522. Under a dynamic load (e.g., jostling or jolting while being transported over uneven terrain or obstacles), we found that the inertia generated by these components can actually cause the retractable side stops 68 to retract. The biasing torsion BT helps maintain the retractable side stops 68 in the deployed configuration 310.

By disposing the actuation pedal assembly 516 in the access notch 592 and routing the structural tubes 506 through the stringers 92, the actuation pedal assembly 516 and the lineal linkage assembly 514 are elevated relative to operate within the height dimension of the framework 32 and provides added clearance for the high capacity cargo/container dolly 30 to pass over objects, ramp transitions, and other terrain irregularities. If the framework 32 clears a given obstacle, so do the lineal linkage assemblies 514. Therefore, if the framework 32 clears an obstacle, operating personnel need not concern themselves with whether the lineal linkage assemblies 514 will clear. The welding of the reinforcement housings 594 and the structural tubes 506 to the side beam assemblies 42 and the stringers 92, respectively, maintains the strength of the side beam assemblies 42 and the stringers 92 so that the notches 592 and 596 do not significantly diminish the structural load capacity of the high capacity cargo/container dolly 30.

Figure 33:
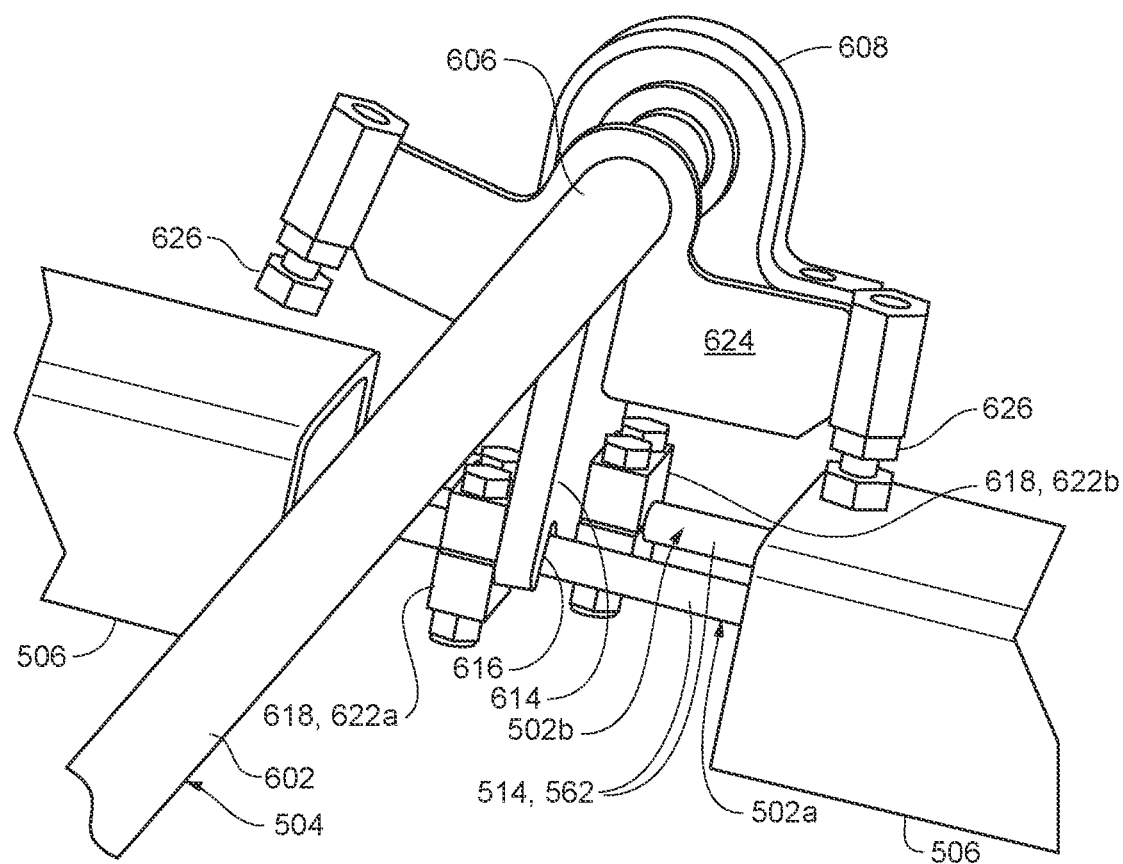
FIG. 33 is a partial perspective view of an auxiliary retraction mechanism of the retraction mechanism assembly of FIG. 29 according to an embodiment of the disclosure.

Referring to FIG. 33 and again to FIG. 29, the auxiliary retraction mechanism 504 is described in greater detail according to an embodiment of the disclosure. In some embodiments, the auxiliary retraction mechanism 504 includes a rotatable linkage 602 that extends axially (i.e., parallel to the centerline 90 of the high capacity cargo/container dolly 30) and having a proximal end 604 and a distal end 606 and supported by pillow blocks 608. An actuation handle 612 is coupled to the proximal end 604, accessible from the forward beam assembly 36. Alternatively, the actuation handle 612 may be accessible from the rearward beam assembly 38 (not depicted). In some embodiments, two actuation handles 612 may be utilized—one accessible from the forward beam assembly 36 and a second accessible from the rearward beam assembly 38 (not depicted). An actuation plate 614 is coupled to the rotatable linkage 602, for example at or near the distal end 606 (depicted), extending in close proximity to the lineal linkage assemblies 514 of the foot actuated retraction mechanisms 502. In the depicted embodiment, the actuation plate 614 includes recesses 616 through which the rods 562 of the lineal linkage assemblies 514 pass. Each rod 562 may be fitted with a contact structure 618 (e.g., clamp blocks 622a, 622b depicted) adjacent the actuation plate 614. In some embodiments, a limit structure 624 extends from the actuation plate 614. The limit structure 624 may include stops 626 configured to engage the structural tubes 506.

In operation, the auxiliary retraction mechanism 504 offers an alternative to selectively retract the retractable side stop(s) 68 on a given side beam assembly 42a or 42b, for example when the desired foot actuated retraction mechanisms 502 is inaccessible. In some embodiments, an operator actuates the auxiliary retraction mechanism 504 by rotating the actuation handle 612 in one of a first rotational direction 642 or a second rotational direction 644. Rotation of the handle 612 causes rotation of the rotatable linkage 602 and actuation plate 614, which causes the actuation plate 614 to engage and push against one of the clamp blocks 622a, 622b. The pushing of the clamp blocks 622a or 622b causes translation of one of the lineal linkage assemblies 614 for actuation of the associated foot actuated retraction mechanism 502. In the depicted embodiment, rotation of the actuation handle 612 in the first rotational direction 642 causes the actuation plate 614 to engage the clamp blocks 622a and actuate the foot actuated retraction mechanism 502a for retraction of the retractable side stop(s) 68 on the side beam assembly 42a; rotation of the actuation handle 612 in the second rotational direction 644 causes the actuation plate 614 to engage the clamp blocks 622b and actuate the foot actuated retraction mechanism 502b for retraction of the retractable side stop(s) 68 on the side beam assembly 42b. The actuation handle 612 may be actuated by grasping and turning the handle 612, or by actuating the handle 612 with a foot.

Figure 34:
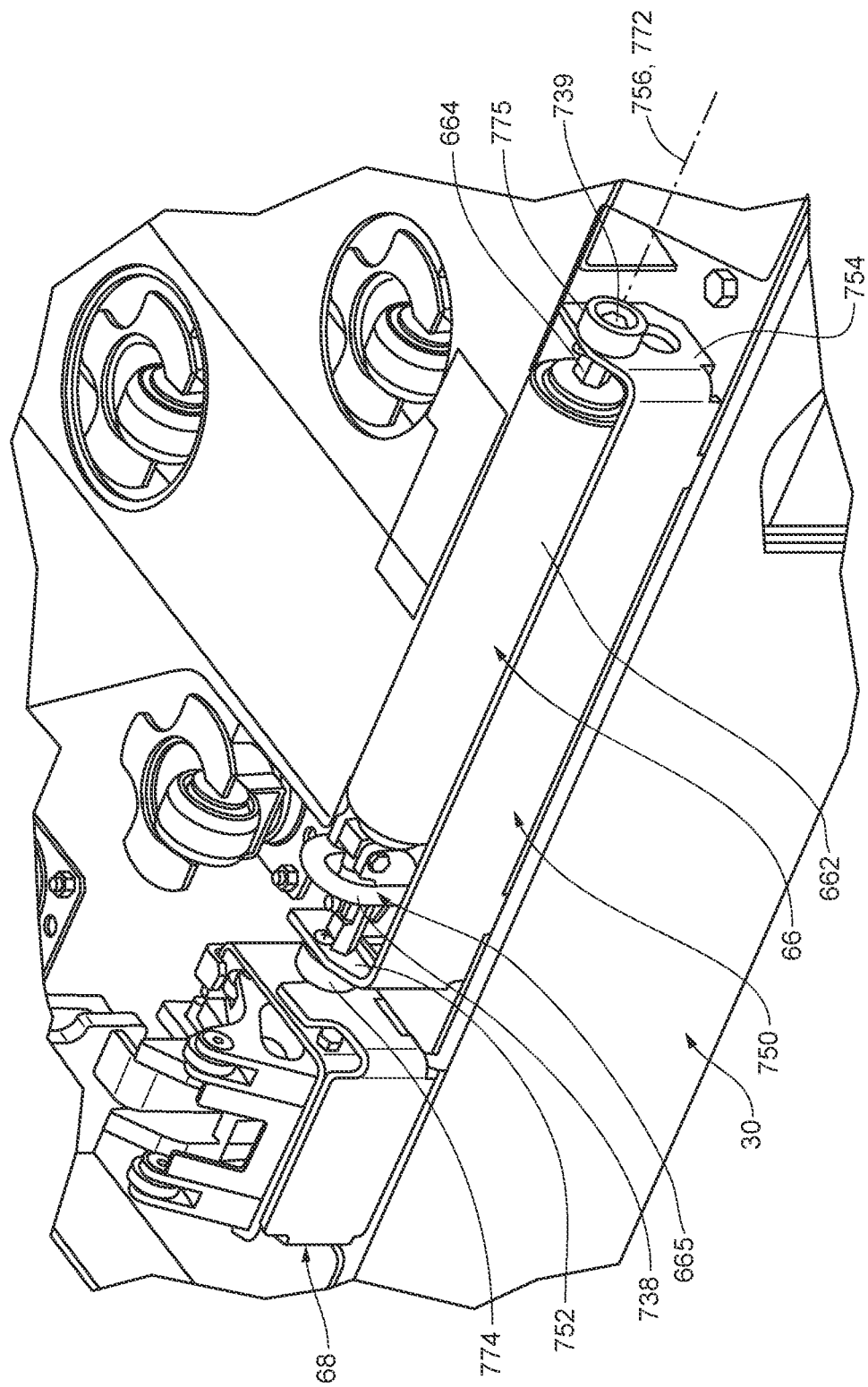
FIG. 34 is a perspective view of a self-locking roller assembly installed on the high capacity cargo/container dolly of FIG. 1 according to an embodiment of the disclosure.
Figure 38:
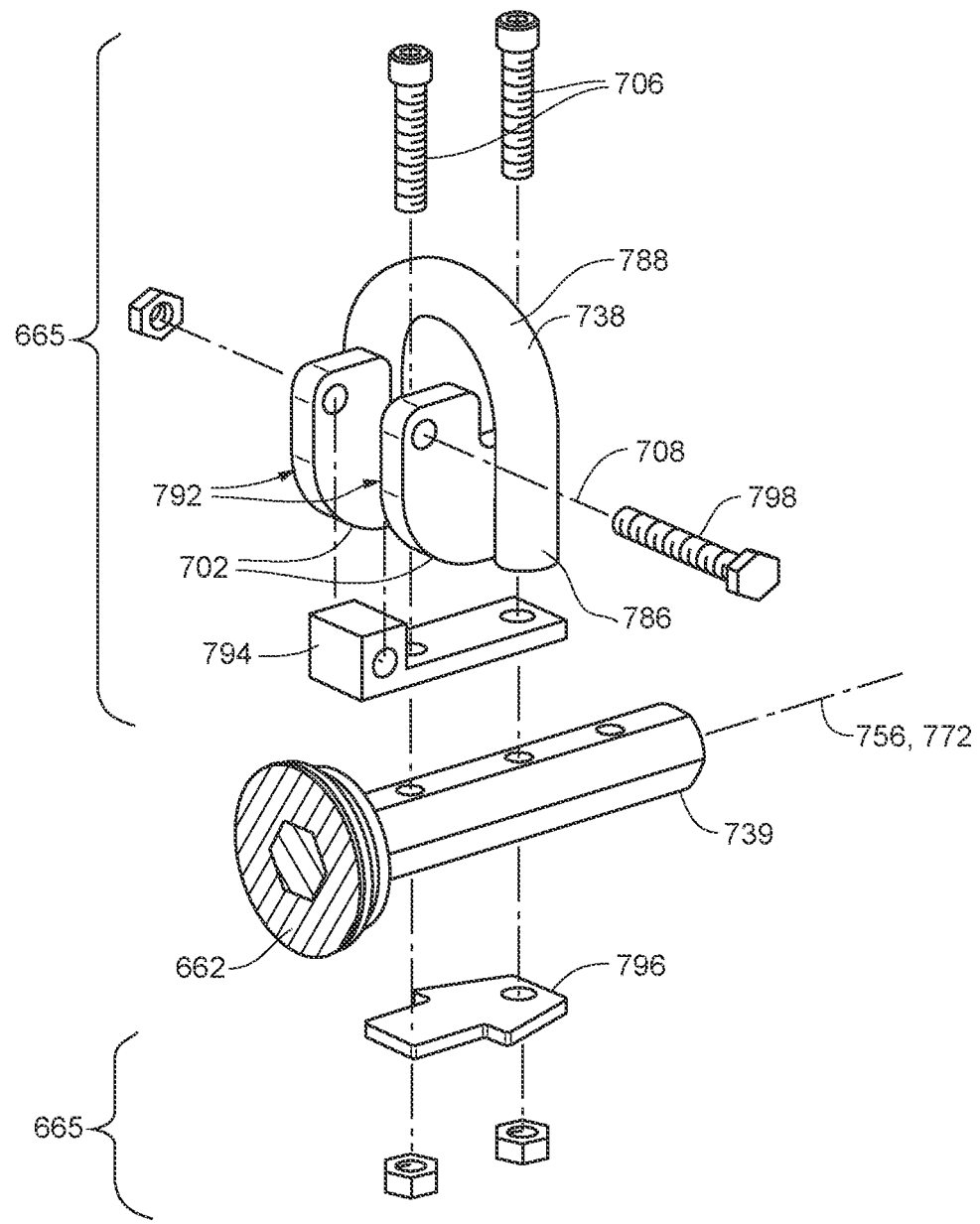
FIG. 38 is an exploded view of an actuator assembly implemented in the locking roller assembly of FIG. 34 according to an embodiment of the disclosure.
Figure 39:
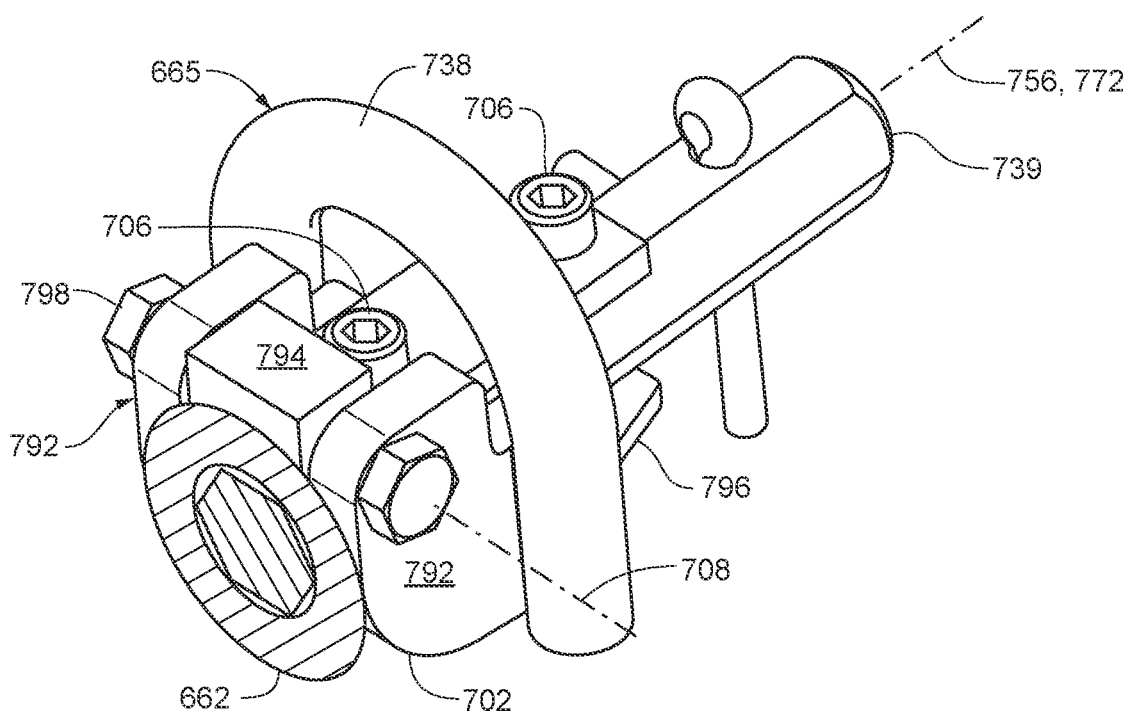
FIGS. 39 and 40 are perspective, assembled views of the actuator assembly of FIG. 38 in the locked configuration according to an embodiment of the disclosure.
Figure 40:
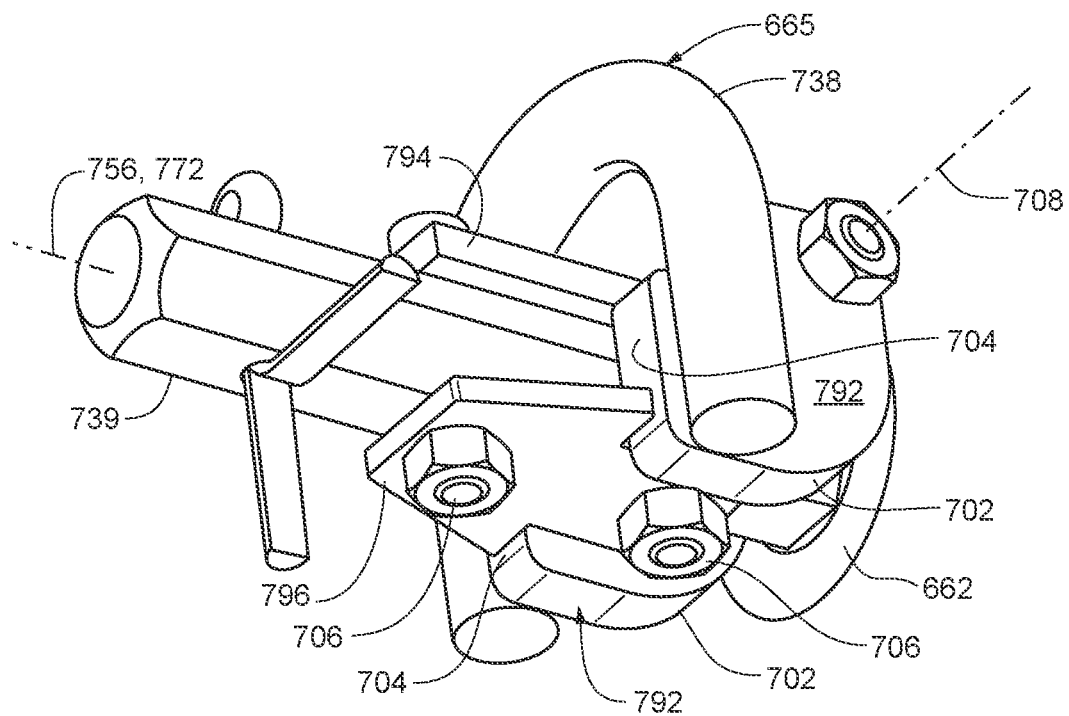

Referring to FIG. 34, the self-locking roller assembly 66 is depicted according to an embodiment of the disclosure. The self-locking roller assembly 66 and alternative embodiments thereof are presented in greater detail at U.S. patent application Ser. No. 16/061,976, filed Jun. 13, 2018, owned by the owner of the present application, the contents of which are hereby incorporated by reference herein in their entirety except for patent claims contained therein.

Referring to FIGS. 34 through 37, the self-locking roller assembly 66 for a roller conveyor is depicted according to an embodiment of the disclosure. The self-locking roller assembly 66 includes a roller 662, a locking mechanism 664, and an actuation mechanism 665 for unlocking the self-locking roller assembly 66. The locking mechanism 664 includes a lock shaft 739, a lock clutch 740 that can be translated over the lock shaft 739, and at least one locking protrusion 737 that extends radially outward from the lock shaft 739. The lock clutch 740 is affixed to the roller 662. In some embodiments, the locking mechanism 664 includes a biasing element 742. For the self-locking roller assembly 66, the actuation mechanism 665 is a lateral actuator assembly, configured to laterally translate the roller 662 and affixed lock clutch 740 over the lock shaft 739.

The self-locking roller assembly 66 may be supported by a roller mount 750 including a first support 752 and a second support 754. The lock shaft 739 of the locking mechanism 664 is suspended at opposing ends by the first support 752 and the second support 754. The roller 662 is selectively rotatable about a rotation axis 756. The lock shaft 739 of the locking mechanism 664 defines a shaft axis 772 that extends parallel to the rotation axis 756, the lock shaft 739 including a first end portion 774 that is mounted to the first support 752 and a second end portion 775 mounted to the second support 754. In the depicted embodiment, the lock shaft axis 772 and the rotation axis 756 are coaxial. Also in the depicted embodiment, the lock shaft 739 and protrusion(s) 737 are in a static relationship relative to the first and second supports 752 and 754. That is, the lock shaft 739 neither rotates nor laterally translates relative to the supports 752 and 754. Instead, the roller 662 and the lock clutch 740 are translatable relative to the lock shaft 739 along the lock shaft axis 772. By this translation, the roller 662 is can be configured in one of a lock position 782 (depicted in FIGS. 34 through 37) and an unlock position 784 (depicted in FIGS. 12 through 14A). In the depicted embodiment, the actuator assembly 665 is configured to laterally translate the roller 662.

The lock clutch 740 is coupled to and in fixed rotational relationship with the roller 662, with the lock clutch 740 being selectively engageable with the protrusion(s) 737. In some embodiments, the lock clutch 740 includes a plurality of fingers 722 that define a plurality of notches 724 therebetween (FIG. 35). The locking mechanism 664 may include at least one protrusion 737 that extends within the plurality of notches 724 to engage the plurality of fingers 722 when the locking mechanism 664 is in the lock position 782, thereby preventing the roller 662 from rotating about the rotation axis 756. The roller 662 and lock clutch 740 translate parallel to the lock shaft axis 772 to pass over the protrusion(s) 737, thereby disengaging the protrusion(s) 737 from the plurality of notches 724 and the plurality of fingers 722 of the lock clutch 740 when the locking mechanism 664 is in the unlock position 784, thereby enabling the roller 662 to rotate about the rotation axis 756. In the depicted embodiment, protrusion(s) 737 extends radially outward relative to the lock shaft axis 772 for selective engagement with the plurality of fingers 722. In some embodiments, and the plurality of fingers 722 extend radially inward from a continuous outer ring portion 728 of the lock clutch 740.

In the depicted embodiment, the biasing element 742 is coupled to the lock shaft 739 to bias the locking mechanism 664 and actuator assembly 665 into the lock position 782. In some embodiments, the biasing element 742 may be one of a spring 732 (depicted) or a repelling magnetic arrangement. By way of non-limiting example, the spring 732 may be one of a coil spring (depicted), a bow spring, and an elastic plug or sleeve. In the depicted embodiment, the spring 732 acts against the protrusion(s) 737 for the biasing. In some embodiments, the protrusion(s) 737 is defined by a pin 734 that extends radially outward relative to the lock shaft axis 772, the pin 734 and spring 732 being configured to so that the spring 732 acts against the pin 734 to bias the locking mechanism 664.

Referring to FIGS. 38 through 40, 44, and 45, the actuator assembly 665 is depicted in more detail according to an embodiment of the disclosure. The actuator assembly 665 includes a lever 738, at least one cam 792, a yoke 794, a stop 796, and a pivot pin 798. The lever 738 is fixedly coupled to the cam(s) 792, for example by welding or other conventional coupling arrangements available to the artisan. In the depicted embodiment, the lever 738 is formed of a round rod 786 having a circular cross-section 787 (FIG. 43A) that defines an arcuate portion 788. The cam(s) 792 includes an arcuate surface 702 and a stop engagement surface 704. In the depicted embodiment, the yoke 794 and stop 796 are diametrically opposed about the lock shaft 739 of the locking mechanism 664, and attached to the lock shaft 739 with fasteners 706 that pass through the yoke 794, lock shaft 739, and stop 796. The cam(s) 792 are pivotally mounted to the yoke 794 with the pivot pin 798, the pivot pin 798 defining a pivot axis 708, the pivot axis 708 extending in a direction that is orthogonal to the lock shaft axis 772. The lever 738 is offset from the pivot axis 708 by a distance X (FIG. 37).

Referring to FIGS. 41 through 45, the self-locking roller assembly 66 is depicted in the unlock position 784 according to an embodiment of the disclosure. The lever 738 and cam(s) 792 are rotatable about the pivot axis 708 for actuation of the locking mechanism 664. In the unlock position 784, the arcuate surface 702 is extended laterally against the end of the roller 662 to laterally translate the roller 662. When in the lock position 782, the lever 738 extends through a plane 776 inclusive of an upper-most tangent line 778 (FIGS. 36, 42, 43, and 43A) of the roller 662 and extending parallel to the pivot axis 708, the plane 776 extending above the first and second supports 752 and 754. In the unlock position, the lever 738 is rotated laterally outward and away from the roller 662 so that an upper extremity of the lever 738 approaches plane 776.

Figure 43A:
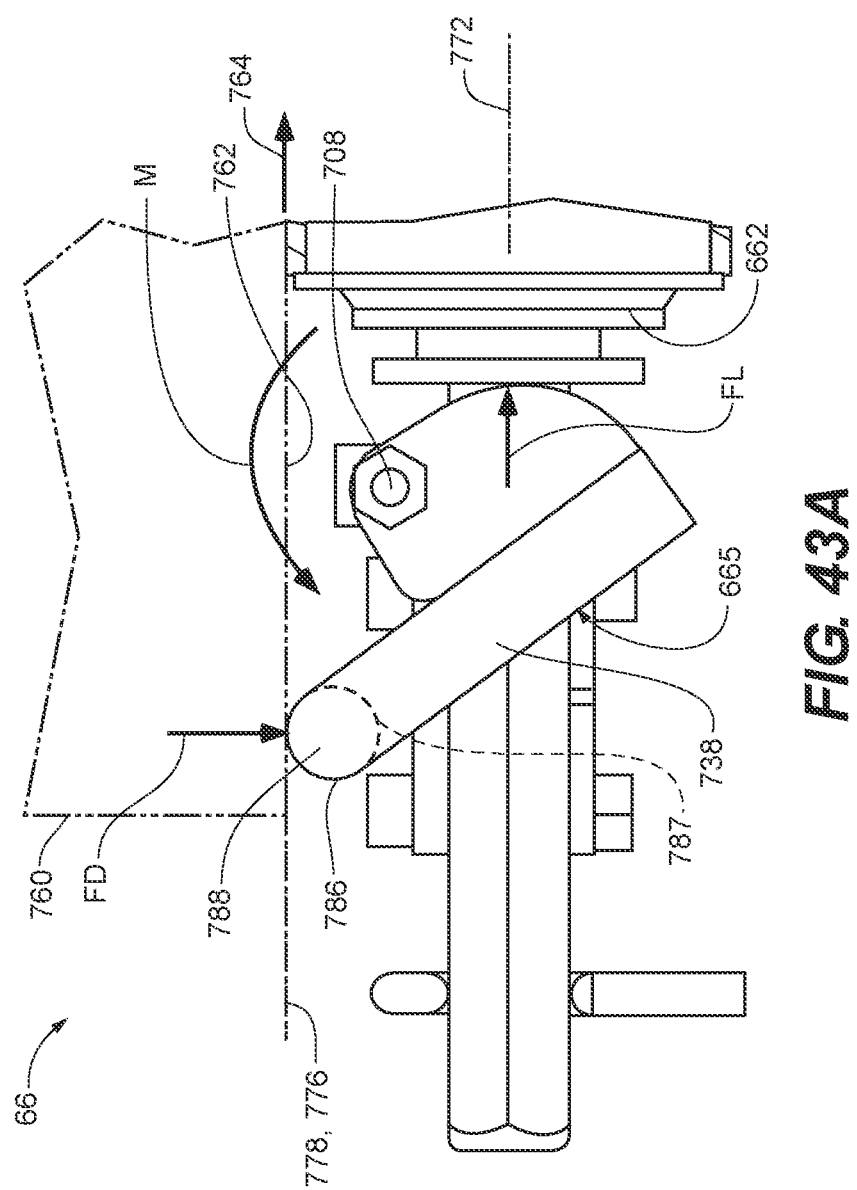
FIG. 43A is an enlarged, partial view of FIG. 43.
Figure 44:
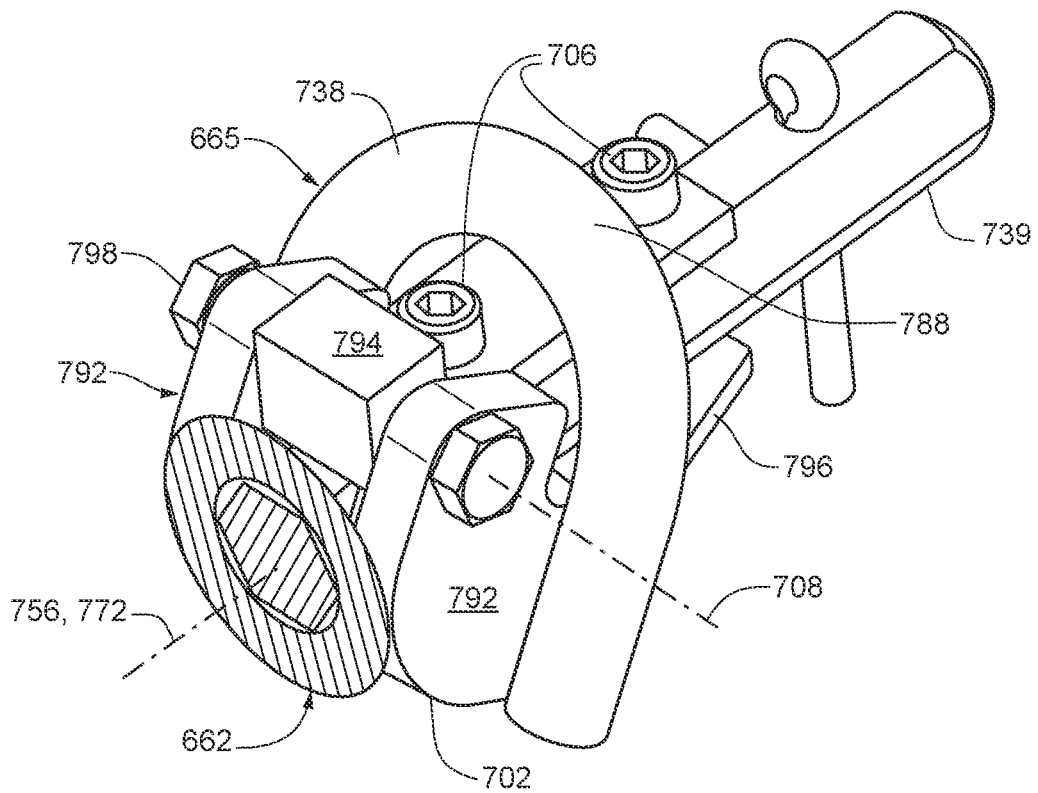
FIGS. 44 and 45 are perspective, assembled views of the actuator assembly of FIG. 38 in the unlocked configuration according to an embodiment of the disclosure.
Figure 45:
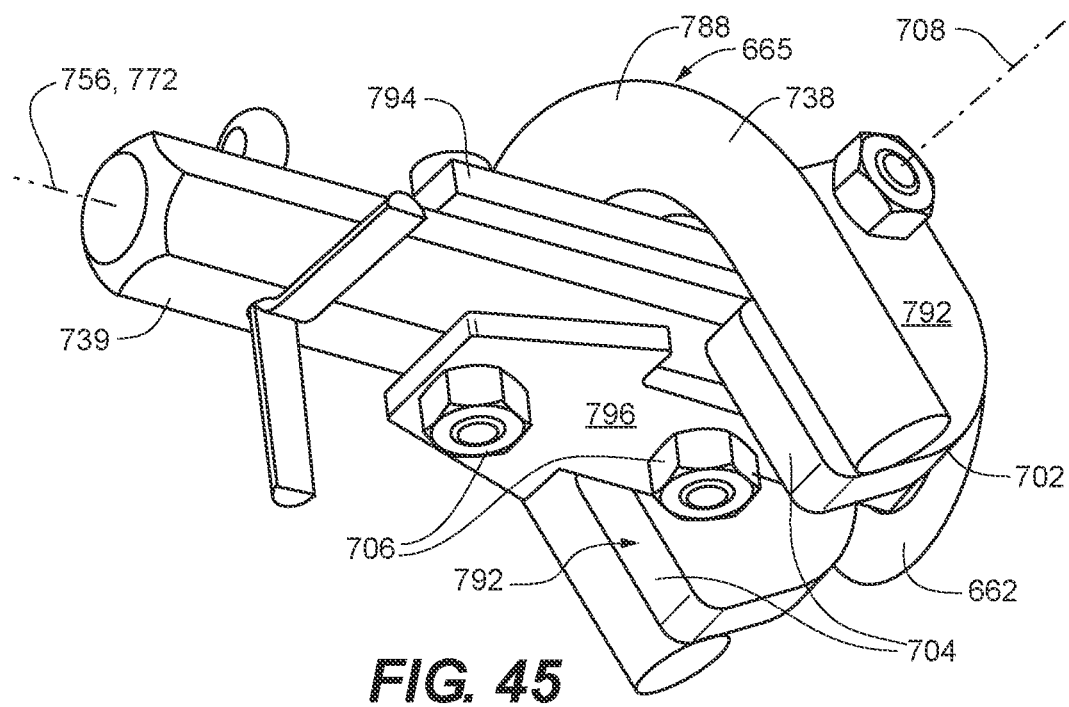
Figure 46:
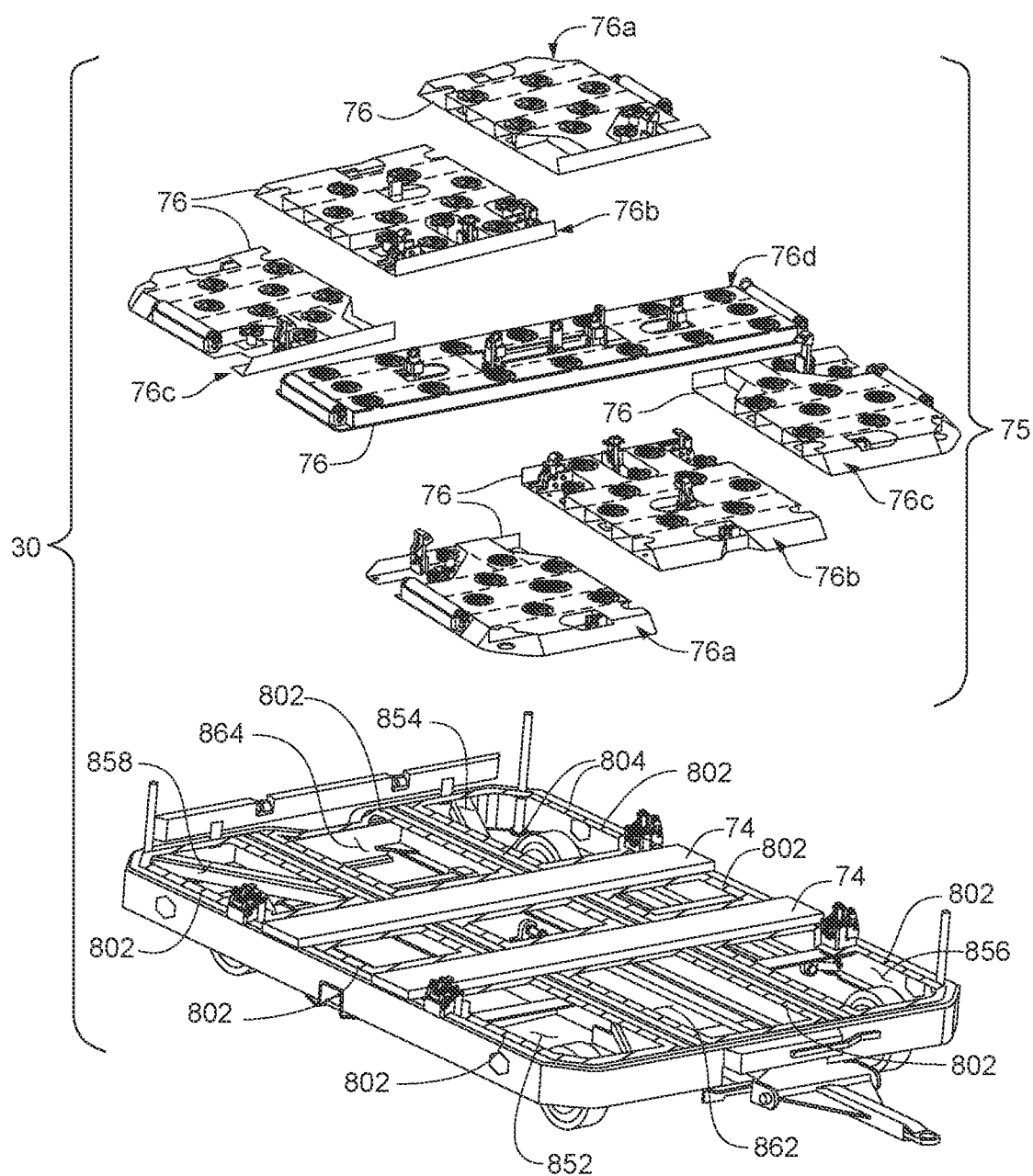
FIG. 46 is an exploded upper perspective view of the framework and deck modules of the cargo/container dolly of FIG. 1 according to an embodiment of the disclosure.
Figure 47:
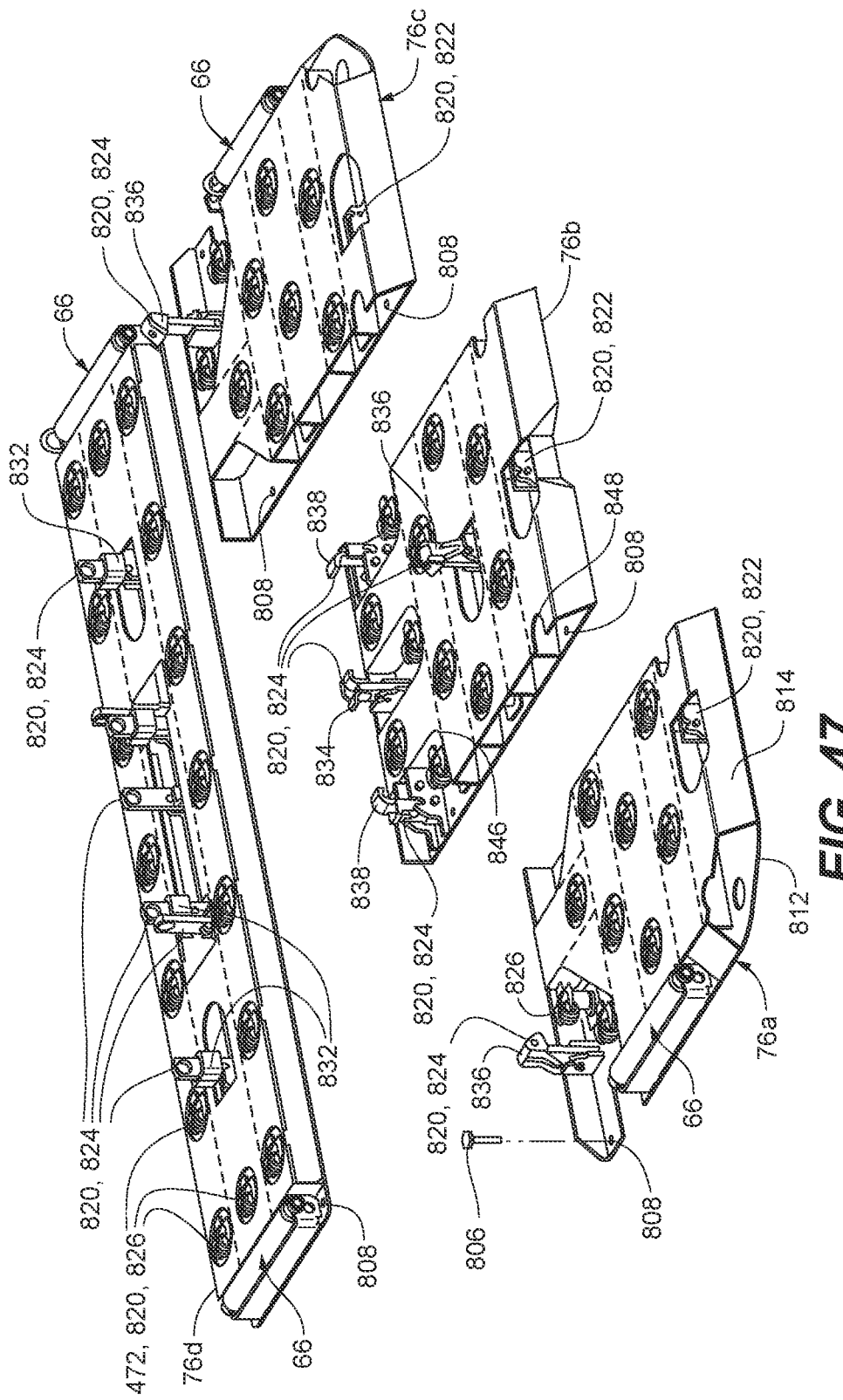
FIG. 47 is an enlarged view of the deck modules of FIG. 46 according to an embodiment of the disclosure.
Figure 48:
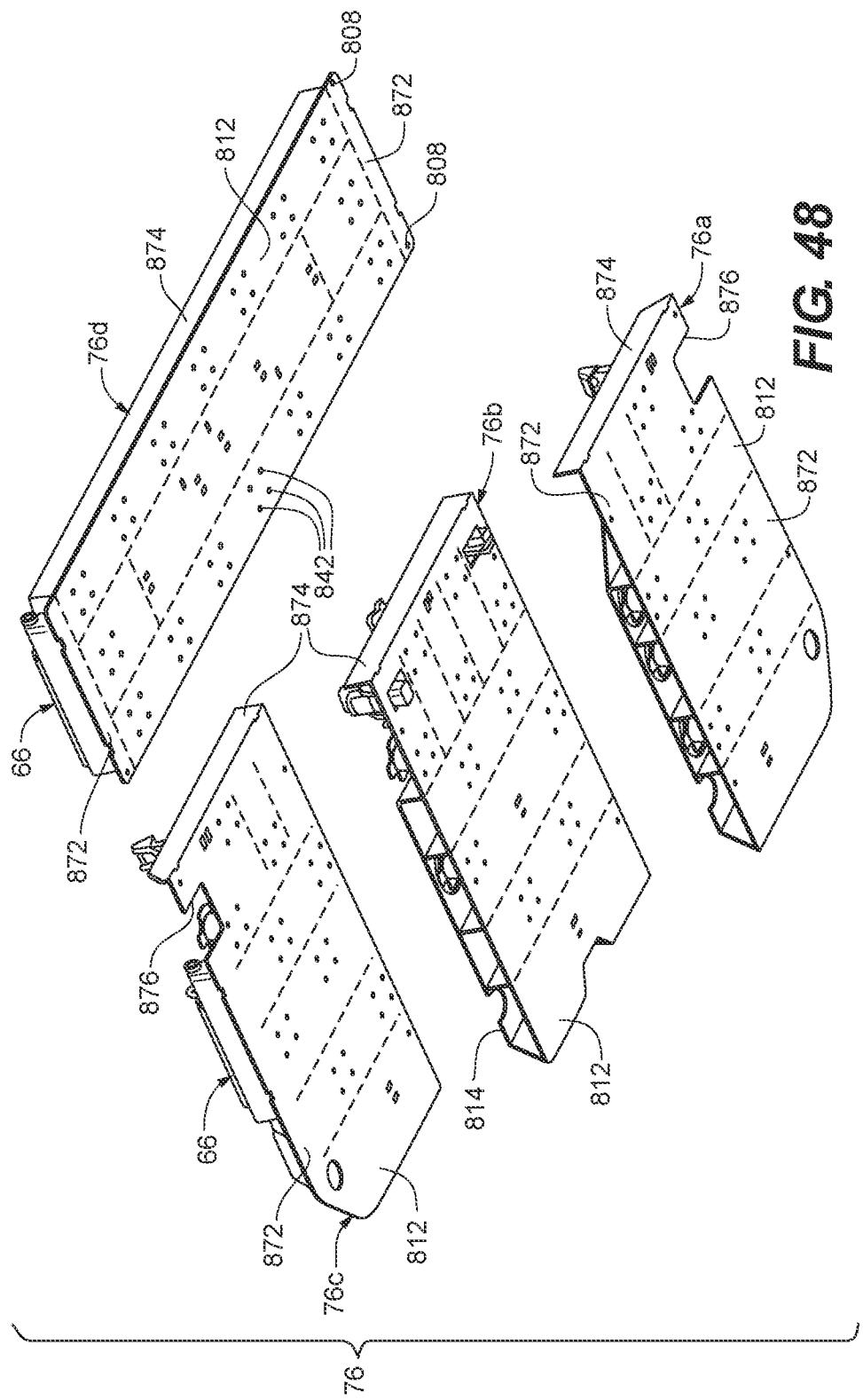
FIG. 48 is a lower perspective view of the deck modules of FIG. 47 according to an embodiment of the disclosure.
Figure 49:
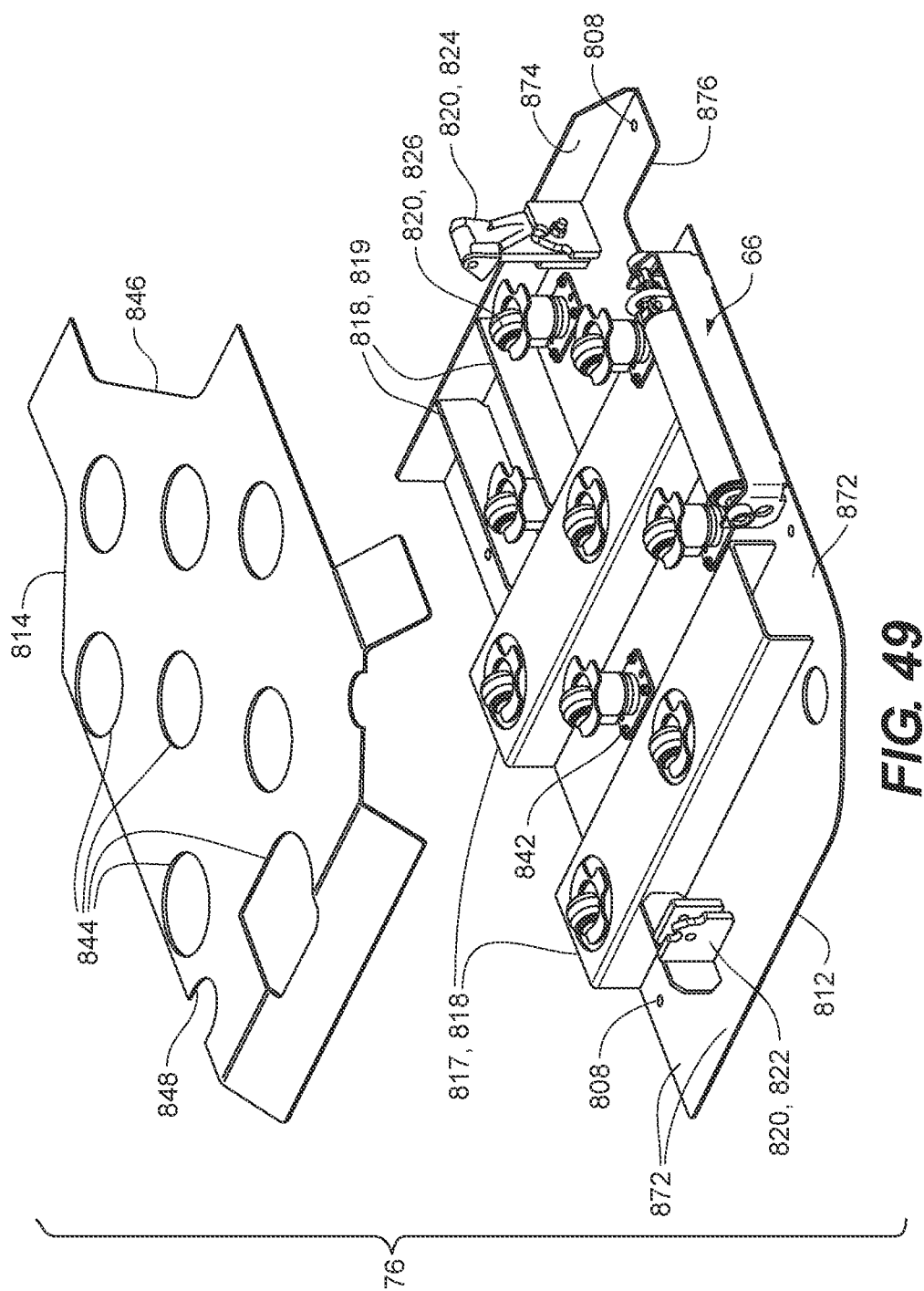
FIG. 49 is an exploded view of a deck module of FIG. 47 according to an embodiment of the disclosure.

In operation, when the actuator assembly 665 is in the lock position 782, the lock shaft 739 and the lock clutch 740 of the locking mechanism 664 are coupled, thereby preventing the roller 662 from rotating about the rotation axis 756 (FIGS. 35 through 37). When an object 760 (FIGS. 41, 43, and 43A) passes over the self-locking roller assembly 66, the object slides up onto the arcuate portion 788 of the lever 738, thereby generating a downward force FD on the lever 738 due to gravity. The downward force FD causes a moment M about the pivot axis 708 because of the offset distance X between the lever 738 and the pivot axis 708. In this way, the actuator assembly 665 is pivoted about the pivot axis 708 into the unlock position 784, causing the cam(s) 792 to rotate toward and exert a lateral force FL on roller 662. The arcuate portion 788 of the lever rotates laterally away from the roller 662, which may cause the arcuate portion 788 to slide against a contacting surface 762 of the object 760 as it pivots downward toward the plane 776 (FIG. 43A). The circular cross-section 787 of the round rod 786 facilitates the sliding action against the contacting surface of the object.

Actuation of the actuation mechanism 665 causes the arcuate surface 702 of the cam(s) 792 to slidingly engage with the end of the roller 662 to exert the lateral force FL and laterally translate the roller 662 relative to the locking mechanism 664 along the lock shaft axis 772. The lateral translation is depicted by arrow 764. Accordingly, the upper-most tangent line 778 of the roller 662 may also slide laterally against the contacting surface 762 of the object, as depicted in FIG. 43A. The lateral translation of the roller 662 causes the lock clutch 740 to pass over the protrusion(s) 737 of the locking mechanism 664 (FIGS. 41-43), thereby disengaging the lock clutch 740 from the protrusion(s) 737 and enabling the roller 662 to rotate about the rotation axis 756. The spring 732 biases the roller 662 laterally toward the actuator assembly 665, so that in the lock position 782, the stop engagement surface 704 of the cam(s) 792 is engaged against the stop 796.

Referring to FIGS. 46 through 49, the deck modules 76 of the high capacity cargo/container dolly 30 are depicted in greater detail according to embodiments of the disclosure. The outer frame 34 and stringers 92 of the framework 32 define an upper registration surface 802 of the high capacity cargo/container dolly 30. In some embodiments, the tineways 74 are attached to the upper registration surface 802. The upper registration surface 802 may be planar. The tineways 74 and framework 32 define a plurality of openings 804 at the upper registration surface 802, the outlines of which are identified in FIG. 46 with cross-hatched lines.

The deck modules 76 of the roller deck 75 are configured to mount to the upper registration surface 802 of the framework 32, for example with fasteners 806 that pass through mounting holes 808 to fasten the deck modules 76 to the framework 32. Each of the deck modules 76 include a lower base plate 812, an upper tread plate 814 that extends over and is affixed (e.g., welded) to the lower base plate 812. The deck modules 76 may include stiffener structures 818, such as channels 817 and gusset plates 819 affixed (e.g., welded) to the lower base plate 812.

The deck modules 76 further include a plurality of components 820 for securing cargo to the roller deck 75. Such fixtures include the self-locking roller assemblies 66 and the swivel casters 472, as well as pallet stop brackets 822, and lift and lay pallet stops 824. The swivel casters may be toe guard casters 826. Some of the lift and lay pallet stops 824 may include added spacer blocks 832 (to reduce container play), rigid vertical restraints 834, spring-loaded vertical restraints 836, or fall away lift and lay pallet stops 838. The components 820 are mounted to the lower base plate 812, for example with fasteners 842 or by welding, and extend or can be configured to extend through apertures 844 or edge cutouts 846 defined on the upper tread plate 814. The upper tread plate 814 may also include access cutouts 848 for accessing the mounting holes 808.

Each deck module 76 may be configured to cover one or more of the openings 804. In some embodiments, there are four different deck module configurations: a first corner module 76a, a center module 76b, a second corner module 76c, and a middle module 76d. The roller deck 75 includes one middle module 76d and two each of the first corner module 76a, center module 76b, and second corner module 76c, for a total of seven deck modules 76. The first corner module 76a may be used at both a forward-right corner position 852 and a rearward left corner position 854 of the framework 32. The second corner module 76c may be used at both a forward-left corner position 856 and a rearward-right corner position 858 of the framework 32. The center module 76b may be used at both a forward-center position 862 and a rearward-center position 864. The middle module 76d may be configured for positioning between tineways 74.

The deck modules 76 are also configured so that the lower base plates 812 effectively cover the openings 804. That is, some edge portions 872 of the lower base plates 812 extend horizontally (i.e., parallel to the plane defined by the x- and y-axes of the Cartesian coordinate 80 of FIG. 1) and overlap onto the stringers 92 and outer frame 34, to which the deck modules 76 are fastened. Other edge portions 874 of the lower base plates 812 extend vertically and are closely adjacent to the tineways 74. Where necessary, the lower base plates 812 define edge cutouts 876 that trace around components that need to extend through the base plates 812 (e.g., to trace around the retractable side stops 68).

Functionally, the use of deck modules 76 enable selected sections to be removed, repaired, or replaced without need of removing or replacing the entire roller deck 75. Also, the use of the first corner module 76a, center module 76b, and second corner module 76c in one of two positions of the roller deck 75 makes these components interchangeable. Accordingly, fewer types of deck modules 76 need to be tooled, fabricated, and inventoried than if the deck modules 76 were not interchangeable. By effectively covering the openings 804, the lower base plates 812 protect the components 820 from debris that impinges the underside of the roller deck 75 (e.g., from road spray).

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A retractable side stop for a cargo/container dolly, comprising:
   a housing;
   a plunger assembly translatable in a vertical direction within said housing;
   a roller linkage assembly pivotally coupled to said housing about a pivot axis, said roller linkage assembly including a pivot arm pivotal about said pivot axis;
   an actuator member coupled to said plunger assembly that contacts said roller linkage assembly when said plunger assembly is translated downward into said housing to rotate said pivot arm about said pivot axis;
   a stop bracket mounted to said housing that defines an uppermost position of said plunger assembly;
   a stop finger coupled to said plunger assembly and defining a vertical stop plane; and
   a catch assembly including a hook that extends upward from a lever, said lever being mounted to a pivot tube that is coupled to said plunger assembly, said lever including a first lateral portion that extends underneath said stop bracket.

2. The retractable side stop of claim 1, wherein said actuator member is attached to said stop finger.

3. The retractable side stop of claim 1, wherein:
   in a capture configuration, said first lateral portion of said lever of said catch assembly is in contact with said stop bracket, a bend portion of said hook of said catch assembly extending through said vertical stop plane in a first lateral direction;
   in a release configuration, said bend portion of said hook being entirely disposed in a second lateral direction from said vertical stop plane, said second lateral direction being opposite said first lateral direction, said first lateral portion of said lever being disengaged from contact with said stop bracket in said release configuration when said plunger assembly is translated axially downward relative to said uppermost position; and said first lateral portion of said lever is configured to disengage from contact with said stop bracket when said plunger assembly is translated a predetermined downward vertical displacement from said uppermost position.

4. The retractable side stop of claim 3, wherein said predetermined downward vertical displacement is in a range of 15 to 38 millimeters inclusive.

5. The retractable side stop of claim 4, wherein said predetermined downward vertical displacement is in a range of 18 to 25 millimeters inclusive.

6. The retractable side stop of claim 1, wherein said actuator member contacts said roller linkage assembly if said pivot arm does not rotate about said pivot axis due to gravity.

7. The retractable side stop of claim 1, wherein an end of said pivot arm that extends from said pivot axis is coupled to said plunger assembly.

8. The retractable side stop of claim 7 comprising a roller disposed at said end of said pivot arm for contacting said plunger assembly.

9. A high capacity cargo/container dolly, comprising:
   a framework defining a centerline and including an outer frame having opposed side beam assemblies that extend parallel to said centerline;
   a retractable side stop disposed proximate a first of said opposed side beam assemblies, said retractable side stop including a housing and a plunger assembly translatable in a vertical direction within said housing;
   a roller deck coupled to said framework that defines a generally horizontal registration plane for objects disposed on the high capacity cargo/container dolly;
   a stop finger coupled to said plunger assembly and defining a vertical stop plane; and
   a linkage assembly pivotally coupled to said housing about a pivot axis,
   wherein:
      said vertical stop plane intersects said registration plane at an intersection line, said intersection line being substantially parallel to said centerline;
      said retractable side stop is configurable in a deployed configuration and a retracted configuration;
      in said deployed configuration, said linkage assembly extends through said registration plane and is disposed laterally outward relative to said centerline from said intersection line; and
      in said retracted configuration, said linkage assembly is located completely below said registration plane.

10. The high capacity cargo/container dolly of claim 9, wherein said roller deck includes a plurality of swivel casters having upper extremities that are coplanar with said registration plane.

11. The high capacity cargo/container dolly of claim 9, wherein, in transitioning said retractable side stop from said deployed configuration to said retracted configuration, said linkage assembly is rotated completely below said registration plane without crossing said intersection line.

12. The high capacity cargo/container dolly of claim 9, wherein said pivot axis is defined by a pivot pin.

13. A high capacity cargo/container dolly, comprising:
   a framework defining a centerline and including an outer frame having opposed side beam assemblies that extend parallel to said centerline;
   a retractable side stop disposed proximate one of said opposed side beam assemblies, said retractable side stop including a housing and a plunger assembly translatable in a vertical direction within said housing; and
   a retraction mechanism operatively coupled to said retractable side stop for reconfiguration of said retractable side stop from a deployed configuration to a retracted configuration, said retraction mechanism including:
      a rotatable shaft that defines and is rotatable about a rotation axis;
      a cam arm mounted to and in fixed rotational relation with said rotatable shaft; and
      an actuation linkage with a collar defining and rotatable about a rocker axis concentric with the rotatable shaft rotation axis and including an arm that extends laterally from said rocker axis, said arm being coupled to said plunger assembly of said retractable side stop,
   wherein said cam arm of said retraction mechanism exerts a force on said arm of said actuation linkage to rotate said arm about said rocker axis when said retraction mechanism is actuated for said reconfiguration of said retractable side stop into said retracted configuration.

14. The high capacity cargo/container dolly of claim 13, wherein said collar is supported by and is freely rotatable about said rotatable shaft.

15. The high capacity cargo/container dolly of claim 14, wherein said rotatable shaft is supported by pillow blocks that depend from said framework.

16. The high capacity cargo/container dolly of claim 13, wherein said retraction mechanism includes a lineal linkage assembly extending laterally through said framework and coupled to said rotatable shaft for rotation of said rotatable shaft about said rotation axis.

17. The high capacity cargo/container dolly of claim 16, wherein said retraction mechanism includes a foot pad coupled to said lineal linkage assembly for translation of said lineal linkage assembly to rotate of said rotatable shaft about said rotation axis.

18. The high capacity cargo/container dolly of claim 13, comprising a torque return spring directly attached to a foot actuated retraction mechanism, said torque return spring being configured to resist dynamic loads on said foot actuated retraction mechanism.

\* \* \* \* \*